United States Patent
Jacoby et al.

(10) Patent No.: US 11,488,195 B1
(45) Date of Patent: Nov. 1, 2022

(54) REWARD OFFER REDEMPTION FOR PAYMENT CARDS

(71) Applicant: Block, Inc., San Francisco, CA (US)

(72) Inventors: Brandon Jacoby, New York, NY (US); Owen Jennings, San Francisco, CA (US); Ali Hussain, Waterloo (CA)

(73) Assignee: BLOCK, INC., San Francisco, CA (US)

( * ) Notice: Subject to any disclaimer, the term of this patent is extended or adjusted under 35 U.S.C. 154(b) by 50 days.

(21) Appl. No.: 15/965,788

(22) Filed: Apr. 27, 2018

(51) Int. Cl.
    *G06Q 30/02* (2012.01)
(52) U.S. Cl.
    CPC ..... *G06Q 30/0238* (2013.01); *G06Q 30/0224* (2013.01); *G06Q 30/0215* (2013.01); *G06Q 30/0221* (2013.01); *G06Q 30/0235* (2013.01); *G06Q 30/0261* (2013.01)
(58) Field of Classification Search
    CPC ........... G06Q 30/0238; G06Q 30/0224; G06Q 30/0215; G06Q 30/0221; G06Q 30/0235; G06Q 30/0261; G06Q 30/0207–30/0277
    See application file for complete search history.

(56) References Cited

U.S. PATENT DOCUMENTS

| | | | |
|---|---|---|---|
| 5,056,019 A | 10/1991 | Schultz et al. | |
| 5,765,141 A | 6/1998 | Spector | |
| 6,321,210 B1 | 11/2001 | O'Brien et al. | |
| 6,398,646 B1 | 6/2002 | Wei et al. | |
| 6,546,389 B1 | 4/2003 | Agrawal et al. | |
| 6,601,049 B1 | 7/2003 | Cooper | |
| 6,694,300 B1 | 2/2004 | Walker et al. | |
| 7,433,499 B2 | 10/2008 | Kim | |
| 7,593,862 B2 | 9/2009 | Mankoff | |
| 7,693,745 B1 | 4/2010 | Pomerantz et al. | |
| 8,442,683 B2 | 5/2013 | Lee et al. | |
| 8,561,894 B1* | 10/2013 | Mullen ................ | G06Q 20/355 705/14.37 |
| 8,577,803 B2 | 11/2013 | Chatterjee et al. | |

(Continued)

FOREIGN PATENT DOCUMENTS

| | | |
|---|---|---|
| WO | 2016/033165 A1 | 3/2016 |
| WO | WO 2019/135749 A1 * | 2/2018 |

(Continued)

OTHER PUBLICATIONS

Non-Final Office Action dated Sep. 15, 2016, of U.S. Appl. No. 15/199,457, for Grassadonia, B., el al., filed Jun. 30, 2016.

(Continued)

*Primary Examiner* — Thuy N Nguyen
(74) *Attorney, Agent, or Firm* — Mattingly & Malur, PC

(57) ABSTRACT

In one embodiment, a method includes receiving information about a payment from a user to a merchant using a payment account issued to the user by a payment service, the payment account being linked to one or more reward offers. Each reward offer is redeemable upon satisfaction of one or more criteria. The method also includes determining that each criterion associated with a reward offer linked to the payment account has been satisfied, redeeming the reward offer to reduce a value associated with the payment, and sending, to an application installed on a client device associated with the user, a user interface indicating that the reward offer has been redeemed in association with the payment.

20 Claims, 17 Drawing Sheets

(56) References Cited

U.S. PATENT DOCUMENTS

| | | | |
|---|---|---|---|
| 8,700,905 B2 | 4/2014 | Guenther | |
| 9,152,973 B2 | 10/2015 | Warner et al. | |
| 9,390,145 B2 | 7/2016 | Weiss et al. | |
| 9,619,831 B1* | 4/2017 | Kumar | G06Q 20/20 |
| 9,741,036 B1 | 8/2017 | Grassadonia et al. | |
| 9,805,384 B2* | 10/2017 | Chauhan | G06Q 30/0222 |
| 10,049,376 B1 | 8/2018 | Joglekar et al. | |
| 10,055,715 B1 | 8/2018 | Grassadonia et al. | |
| 10,706,417 B2 | 7/2020 | Koser et al. | |
| 10,949,825 B1* | 3/2021 | Brosamer | G06Q 20/202 |
| 11,341,523 B1 | 5/2022 | Jacoby et al. | |
| 2002/0107926 A1 | 2/2002 | Saito | |
| 2002/0042742 A1 | 4/2002 | Glover et al. | |
| 2002/0046169 A1 | 4/2002 | Keresman, III et al. | |
| 2002/0052818 A1 | 5/2002 | Loveland | |
| 2002/0150295 A1 | 10/2002 | Kwok et al. | |
| 2002/0161631 A1* | 10/2002 | Banerjee | G06Q 30/02 705/14.66 |
| 2003/0004803 A1 | 1/2003 | Glover et al. | |
| 2003/0004809 A1 | 1/2003 | Palcic et al. | |
| 2003/0018530 A1 | 1/2003 | Walker et al. | |
| 2004/0006536 A1* | 1/2004 | Kawashima | G06Q 20/04 705/39 |
| 2004/0133081 A1 | 7/2004 | Teller et al. | |
| 2004/0210505 A1 | 10/2004 | Pourhamid | |
| 2005/0035550 A1 | 2/2005 | Jackson | |
| 2006/0053056 A1* | 3/2006 | Alspach-Goss | G06Q 30/06 705/14.27 |
| 2006/0069619 A1 | 3/2006 | Walker et al. | |
| 2006/0118611 A1 | 6/2006 | Michelsen et al. | |
| 2007/0022303 A1 | 1/2007 | Awatsu et al. | |
| 2007/0208624 A1 | 9/2007 | Gallagher | |
| 2007/0255620 A1 | 11/2007 | Tumminaro et al. | |
| 2007/0265950 A1 | 11/2007 | Reuss | |
| 2008/0133351 A1* | 6/2008 | White | G07G 1/14 705/14.27 |
| 2008/0201230 A1 | 8/2008 | Alfonso et al. | |
| 2008/0208688 A1 | 8/2008 | Byerley et al. | |
| 2009/0234771 A1 | 9/2009 | Ledbetter et al. | |
| 2009/0276284 A1 | 11/2009 | Yost | |
| 2009/0288012 A1 | 11/2009 | Hertel et al. | |
| 2010/0089998 A1 | 4/2010 | Sandstrom et al. | |
| 2010/0169160 A1 | 7/2010 | Wu et al. | |
| 2010/0174609 A1 | 7/2010 | Bax et al. | |
| 2010/0325006 A1 | 12/2010 | White | |
| 2011/0029370 A1 | 2/2011 | Roeding et al. | |
| 2011/0099088 A1 | 4/2011 | Berrios et al. | |
| 2011/0106607 A1 | 5/2011 | Hardison | |
| 2011/0231257 A1* | 9/2011 | Winters | G06Q 30/0255 705/14.53 |
| 2011/0264499 A1* | 10/2011 | Abendroth | G06Q 30/02 705/14.23 |
| 2011/0307917 A1 | 12/2011 | Shuster | |
| 2012/0059736 A1 | 3/2012 | Bhattacharya et al. | |
| 2012/0084164 A1 | 4/2012 | Hammad et al. | |
| 2012/0150732 A1 | 6/2012 | Issacson et al. | |
| 2012/0150743 A1 | 6/2012 | Issacson et al. | |
| 2012/0166267 A1 | 6/2012 | Beatty et al. | |
| 2012/0203608 A1 | 8/2012 | Lele et al. | |
| 2012/0221421 A1* | 8/2012 | Hammad | G06Q 10/00 705/16 |
| 2012/0259768 A1 | 10/2012 | Mukherjee | |
| 2012/0290449 A1 | 11/2012 | Mullen et al. | |
| 2012/0296716 A1 | 11/2012 | Barbeau et al. | |
| 2012/0296818 A1 | 11/2012 | Nuzzi et al. | |
| 2012/0330769 A1* | 12/2012 | Arceo | G06Q 20/4014 705/21 |
| 2013/0024361 A1 | 1/2013 | Choudhuri et al. | |
| 2013/0024371 A1* | 1/2013 | Hariramani | G06Q 20/36 705/41 |
| 2013/0054336 A1 | 2/2013 | Graylin | |
| 2013/0080239 A1 | 3/2013 | Okerlund | |
| 2013/0151323 A1* | 6/2013 | Shepard | G06Q 30/0222 705/14.23 |
| 2013/0159132 A1 | 6/2013 | Adams | |
| 2013/0197991 A1 | 8/2013 | Basu et al. | |
| 2013/0218657 A1 | 8/2013 | Salmon et al. | |
| 2013/0282461 A1* | 10/2013 | Ovick | G06Q 30/0222 705/14.23 |
| 2013/0339114 A1 | 12/2013 | Plut | |
| 2013/0346314 A1 | 12/2013 | Mogollon et al. | |
| 2014/0012701 A1 | 1/2014 | Wall et al. | |
| 2014/0025461 A1 | 1/2014 | Knowles et al. | |
| 2014/0046744 A1* | 2/2014 | Hagey | G06Q 20/387 705/14.23 |
| 2014/0058818 A1 | 2/2014 | Drozd et al. | |
| 2014/0067514 A1* | 3/2014 | Vitti | G06Q 30/0236 705/14.1 |
| 2014/0149197 A1 | 5/2014 | James et al. | |
| 2014/0149201 A1 | 5/2014 | Abbott et al. | |
| 2014/0172652 A1* | 6/2014 | Pobbathi | G06Q 10/087 705/28 |
| 2014/0214626 A1 | 7/2014 | Bowers et al. | |
| 2014/0249904 A1* | 9/2014 | Nelsen | G06Q 20/10 705/14.23 |
| 2014/0249947 A1 | 9/2014 | Hicks et al. | |
| 2014/0279450 A1 | 9/2014 | Gujral | |
| 2014/0351132 A1* | 11/2014 | Wieler | G06Q 20/4016 705/44 |
| 2014/0372300 A1* | 12/2014 | Blythe | G06Q 20/3676 705/41 |
| 2015/0019418 A1 | 1/2015 | Hotard et al. | |
| 2015/0023526 A1 | 1/2015 | Nathan et al. | |
| 2015/0064671 A1 | 3/2015 | Murville et al. | |
| 2015/0066757 A1 | 3/2015 | Shenoy et al. | |
| 2015/0120429 A1 | 4/2015 | Salmon et al. | |
| 2015/0134413 A1 | 5/2015 | Deshpande et al. | |
| 2015/0149272 A1 | 5/2015 | Salmon et al. | |
| 2015/0215797 A1 | 7/2015 | Yoshimi et al. | |
| 2015/0235260 A1 | 8/2015 | Wei et al. | |
| 2015/0278849 A1* | 10/2015 | Reichert | G06Q 30/0276 705/14.41 |
| 2015/0324846 A1 | 11/2015 | Feldman et al. | |
| 2015/0371219 A1 | 12/2015 | Ljujic | |
| 2016/0063484 A1 | 3/2016 | Carpenter et al. | |
| 2016/0275486 A1 | 9/2016 | Liu et al. | |
| 2016/0321709 A1* | 11/2016 | Reichert | G06Q 30/0268 |
| 2017/0076265 A1 | 3/2017 | Royyuru et al. | |
| 2017/0124548 A1* | 5/2017 | Bolla | H04W 4/80 |
| 2017/0154341 A1 | 6/2017 | Gilbertson | |
| 2018/0005231 A1 | 1/2018 | Grassadonia et al. | |
| 2018/0034511 A1 | 2/2018 | Smets et al. | |
| 2018/0096340 A1 | 4/2018 | Omojola et al. | |
| 2018/0101841 A1 | 4/2018 | Kohli | |
| 2018/0137530 A1* | 5/2018 | Wheeler | G06Q 30/0207 |
| 2018/0150823 A1 | 5/2018 | Omojola et al. | |
| 2018/0240143 A1 | 8/2018 | Salmon et al. | |
| 2018/0330342 A1 | 11/2018 | Prakash et al. | |
| 2019/0050887 A1 | 2/2019 | Nelsen | |
| 2019/0073666 A1 | 3/2019 | Ortiz et al. | |
| 2019/0073669 A1* | 3/2019 | Dutta | G06Q 20/4015 |
| 2019/0108543 A1 | 4/2019 | Chan et al. | |
| 2019/0325473 A1 | 10/2019 | Swamidurai | |
| 2019/0378125 A1 | 12/2019 | Wong et al. | |
| 2020/0005115 A1 | 1/2020 | Malkevich et al. | |
| 2020/0051111 A1 | 2/2020 | Nelsen et al. | |
| 2020/0058068 A1 | 2/2020 | Gandhi et al. | |
| 2020/0065847 A1 | 2/2020 | Harrison et al. | |
| 2020/0258099 A1 | 8/2020 | Alghamdi | |
| 2020/0265392 A1 | 8/2020 | Garrett | |
| 2020/0279249 A1 | 9/2020 | Ta | |
| 2020/0410490 A1* | 12/2020 | Dutta | G06Q 20/405 |
| 2021/0182805 A1 | 6/2021 | Benkreira et al. | |
| 2022/0005020 A1 | 1/2022 | Moring et al. | |

FOREIGN PATENT DOCUMENTS

| | | |
|---|---|---|
| WO | 2018/063809 A1 | 4/2018 |

(56) References Cited

FOREIGN PATENT DOCUMENTS

| | | |
|---|---|---|
| WO | 2019023168 A1 | 1/2019 |
| WO | 2022010784 A1 | 1/2022 |

OTHER PUBLICATIONS

Notice of Allowance dated Apr. 21, 2017, of U.S. Appl. No. 15/199,457, for Grassadonia, B., et al., filed Jun. 30, 2016.
Non-Final Office Action dated Jul. 27, 2017, for U.S. Appl. No. 14/453,551, of Brock, Z., filed Aug. 6, 2014.
Non-Final Office Action dated Sep. 20, 2017, for U.S. Appl. No. 15/679,968, of Grassadonia, B., et al., filed Aug. 17, 2017.
Non-Final Office Action dated Dec. 8, 2017, for U.S. Appl. No. 15/382,132, of Westen, P., et al., filed Dec. 16, 2016.
Notice of Allowance dated Jan. 8, 2018, for U.S. Appl. No. 15/679,968, of Grassadonia, B., et al., filed Aug. 17, 2017.
Final Office Action dated Feb. 9, 2018, for U.S. Appl. No. 14/453,551, of Brock, Z., filed Aug. 6, 2014.
Notice of Allowance dated Mar. 26, 2018, for U.S. Appl. No. 15/382,132, of Westen, P., et al., filed Dec. 16, 2016.
Notice of Allowance dated May 31, 2018, for U.S. Appl. No. 15/679,968, of Grassadonia, B., et al., filed Aug. 17, 2017.
Non Final office Action dated Jun. 15, 2018, for U.S. Appl. No. 15/721,212, of Omojola, A., et al., filed Sep. 29, 2017.
Non Final office Action dated Jun. 27, 2018, for U.S. Appl. No. 15/965,792, of Jacoby, B., et al., filed Apr. 27, 2018.
International Search Report and Written Opinion for International Application No. PCT/US2017/051468, dated Nov. 22, 2017.
Final Office Action dated Dec. 3, 2018, for U.S. Appl. No. 15/965,792, of Jacoby, B., et al., filed Apr. 27, 2018.
Advisory Action dated Feb. 19, 2019, for U.S. Appl. No. 15/965,792, of Jacoby, B., et al., filed Apr. 27, 2018.
Non-Final Office Action dated May 31, 2019, for U.S. Appl. No. 16/370,866, of Jacoby, B., et al., filed Mar. 29, 2019.
Non-Final Office Action dated Jul. 23, 2019, for U.S. Appl. No. 15/965,792, of Jacoby, B. et al., filed Apr. 27, 2018.
David Intersimone, "Using Image and Animation Effects, Jun. 21, 2012, Embarcadero Technologies, Inc.,", Lesson 8 http://firemonkey.borlandforum.com/impboard/attach/0000143970/e_learning_series_win_mac_development_coursebook_lesson8.pdf (Year: 2012).
Final Office Action dated Nov. 8, 2019, for U.S. Appl. No. 16/370,866, of Jacoby, B., et al., filed Mar. 29, 2019.
Final Office Action dated Dec. 12, 2019, for U.S. Appl. No. 15/965,792, of Jacoby, B. et al., filed Apr. 27, 2018.
Advisory Action dated Mar. 17, 2020, for U.S. Appl. No. 15/965,792, of Jacoby, B. et al., filed Apr. 27, 2018.
Non-Final Office Action dated Apr. 7, 2020, for U.S. Appl. No. 16/370,843, of Jacoby, B., et al., filed Mar. 29, 2019.
Non-Final Office Action dated Apr. 17, 2020, for U.S. Appl. No. 16/370,866, of Jacoby, B., et al., filed Mar. 29, 2019.
Non-Final Office Acton dated Jun. 12, 2020, for U.S. Appl. No. 15/965,792, of Jacoby, B. et al., filed Apr. 27, 2018.
Non-Final Office Action dated Oct. 6, 2020, for U.S. Appl. No. 16/370,875, of Jacoby, B. et al., filed Mar. 29, 2019.
Final Office Action dated May 25, 2021, for U.S. Appl. No. 16/921,753, of Moring, D. et al., filed Jul. 6, 2020.
Final Office Action dated Aug. 13, 2020, for U.S. Appl. No. 16/370,843, of Jacoby, B., et al., filed Mar. 29, 2019.
Final Office Action dated Sep. 3, 2020, for U.S. Appl. No. 16/370,866, of Jacoby, B., et al., filed Mar. 29, 2019.
Non-Final Office Action dated Sep. 4, 2020, for U.S. Appl. No. 16/263,797, of Bricca, G. et al., filed Jan. 31, 2019.
"Amadeus maintains growth with strong 2015," Targeted News Service, Retrieved from internet URL: https//dialog.proquest.com/professional/docview/1768313004?accountid=131444 on Feb. 26, 2016, pp. 1-8.
Final Office Acton dated Dec. 3, 2020, for U.S. Appl. No. 15/965,792, of Jacoby, B. et al., filed Apr. 27, 2018.
Final Office Action dated Dec. 22, 2020, for U.S. Appl. No. 16/263,797, of Bricca, G. et al., filed Jan. 31, 2019.
Advisory Action dated Mar. 17, 2021, for U.S. Appl. No. 16/263,797, of Bricca, G. et al., filed Jan. 31, 2019.
Non-Final Office Action dated Apr. 1, 2021, for U.S. Appl. No. 16/263,797, of Bricca, G. et al., filed Jan. 31, 2019.
Final Office Action dated Feb. 11, 2021, for U.S. Appl. No. 16/370,875, of Jacoby, B. et al., filed Mar. 29, 2019.
Non-Final Office Action dated Feb. 19, 2021, for U.S. Appl. No. 16/370,843, of Jacoby, B., et al., filed Mar. 29, 2019.
Advisory Action dated Sep. 15, 2021, for U.S. Appl. No. 16/921,753, of Moring, D. et al., filed Jul. 6, 2020.
Advisory Action dated Oct. 29, 2021, for U.S. Appl. No. 16/263,797, of Bricca, G. et al., filed Jan. 31, 2019.
Notice of Allowance dated Jan. 3, 2021, for U.S. Appl. No. 16/370,843, of Jacoby, B., et al., filed Mar. 29, 2019.
Final Office Action dated Jan. 27, 2022, for U.S. Appl. No. 16/370,875, of Jacoby, B. et al., filed Mar. 29, 2019.
Final Office Action dated Jul. 22, 2021, for U.S. Appl. No. 16/370,843, of Jacoby, B., et al., filed Mar. 29, 2019.
Non-Final Office Action dated Aug. 4, 2021, for U.S. Appl. No. 16/370,875, of Jacoby, B. et al., filed Mar. 29, 2019.
Final Office Action dated Aug. 12, 2021, for U.S. Appl. No. 16/263,797, of Bricca, G. et al., filed Jan. 31, 2019.
Non-Final Office Action dated Jan. 8, 2021, for U.S. Appl. No. 16/921,753, of Moring, D. et al., filed Jul. 6, 2020.
International Search Report and Written Opinion dated Oct. 5, 2021, for PCT Application No. PCT/US2021/040303.
Non-Final Office Action dated Mar. 7, 2022, for U.S. Appl. No. 16/921,753, of Moring, D. et al., filed Jul. 6, 2020.
Non-Final Office Action dated Mar. 16, 2022, for U.S. Appl. No. 16/263,797, of Bricca, G. et al., filed Jan. 31, 2019.

* cited by examiner

REWARD OFFER REDEMPTION FOR PAYMENT CARDS

BACKGROUND

A financial-service provider may issue payment cards to its users for making payments. The payment cards may be associated with reward programs or promotional offers provided by the financial-service provider. One or more merchants may also provide reward programs or promotional offers to their current or potential customers. Information about the reward programs or promotional offers may be communicated to the customers via one or more traditional or online communication methods and may be represented by one or more physical or electronic tokens. A reward or offer may be redeemed with an affirmative action by a user, such as presenting a paper-based coupon or entering a promotional code.

However, reward programs or promotional offers may not be customized to suit the interest of each individual customer. A customer may often be forced to view many irrelevant or uninteresting promotional information. It may often be difficult to integrate offers for particular products or services offered by particular merchants with particular payment methods, making it hard to channel merchant's marketing efforts through financial-service providers. Furthermore, viewing, accepting, and redeeming promotional offers may often require good memory and affirmative activities by a customer and may often involve a delay. These factors all limit a customer's ability to effectively take advantage of reward programs and promotional offers provided to them.

DESCRIPTION OF EXAMPLE EMBODIMENTS

Figure 1:
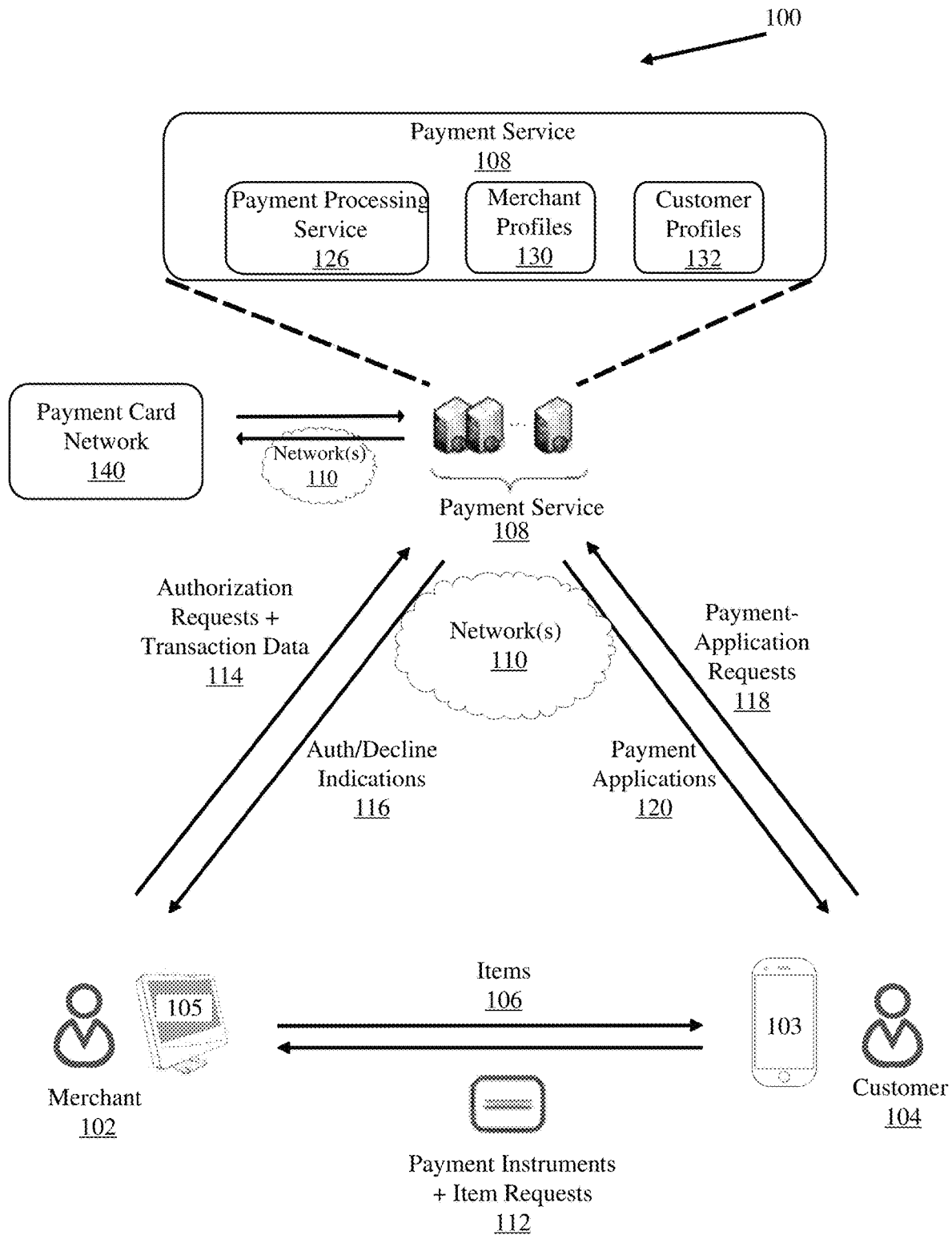
FIG. 1 illustrates an example system for processing payments.

In particular embodiments, a payment service may extend reward offers to users of payment cards issued by the payment service and may directly redeem the reward offers accepted by the users when the payment card is used to make a purchase. In particular embodiments, the payment service may issue a payment card to each of a plurality of users. A user may use the payment card to make a payment from a credit extended by the payment service or from a cash balance deposited by the user with the payment service. The payment service may offer one or more reward offers to a user as an incentive to continue using the payment card and as a marketing tool for one or more merchants. Each reward offer may be redeemable to reduce an amount of payment required for one or more products or services. The reward offers for a particular user may be selected based on machine-learning model configured to analyze information from a plurality of sources. The payment service may provide one or more selected reward offers for display in a user interface of a client device associated with a user. The user may pick one or more of the reward offers to connect with the user's payment card for future user. After a particular reward offer has been associated with a user's payment card, the payment service may detect a future payment by the user using the payment card and determine whether each criterion associated with the reward offer has been satisfied at the time of the payment. If so, the payment service may automatically apply the reward offer and reduce an amount of payment by the user.

Particular embodiments disclosed herein provide users of a payment card improved experience by customizing reward offers to individual users using tools based on data science techniques, machine learning, and artificial intelligence. Particular embodiments also improve the efficiency of accepting and using rewards and promotions by automating the process of redeeming reward offers at a point of sale device, which is made seamless at the time of a qualifying payment at the point of sale of the merchant. In addition, particular embodiments improve the accuracy and effect of payment systems through this automated redemption process as the rewards are personalized to the customer and merchant, and in some instances for a certain duration, such that the reward is automatically applied to a qualifying transaction and verified against predefined rules without merchant intervention. Still further, through engagement with a user interface of a mobile application, particular embodiments improve the capability of a physical payment card which can be used for processing payments and applying merchant rewards or discounts to qualifying transactions when used at the point of sale. Furthermore, particular embodiments allow the payment service to further stimulate user interest in using the payment card and shopping at particular merchants by providing novel user-interface features that are designed to cause tangible and positive user feelings.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

FIG. 1 illustrates an example environment 100 that includes merchant 102 that conducts transactions with customer 104 (or "user 104") for items 106 offered by the merchant 102. FIG. 1 also illustrates a payment service system 108 (also referred to as "payment service"), coupled to merchant point of sale (POS) device 105 and customer device 103 via a network 110, to authorize payment instruments of customer 104.

Customer 104 may engage in transactions with merchant 102 to obtain items 106. Customer 104 may provide, as shown at 112, cash or any other kind of payment instruments to merchant 102 along with requests for items offered by merchant 102.

Merchant 102 may utilize POS device 105 for accepting payment from customers 104. POS device 105 may comprise any sort of mobile or non-mobile devices that include instances of a merchant application that executes on the devices. The merchant application may provide POS functionality to POS device 105 to enable merchant 102 (e.g., owners, employees, etc.) to accept payments from customers 104. In some types of businesses, POS device 105 may correspond to a store or other place of business of the merchant, and thus, may be a fixed location that typically does not change on a day-to-day basis. In other types of businesses, however, the location of POS device 105 may change from time to time, such as in the case that a merchant operates a food truck, is a street vendor, is a cab driver, etc., or has an otherwise mobile business, e.g., in the case of a merchant who sells items at buyer's homes, places of business, and so forth.

As used herein, a merchant may include any business engaged in the offering of goods or services for acquisition by customers. Actions attributed to a merchant may include actions performed by owners, employees, or other agents of the merchant, and thus no distinction is made herein unless specifically discussed. In addition, as used herein, a customer may include any entity that acquires goods or services from a merchant, such as by purchasing, renting, leasing, borrowing, licensing, or the like. Hereinafter, goods and/or services offered by merchants may be referred to as items, e.g. item 106. Thus, a merchant and a customer may interact with each other to conduct a transaction in which the customer acquires item 106 from merchant 102, and in return, customer 104 provides payment 112 to merchant 102.

As used herein, a transaction may include a financial transaction for the acquisition of item(s) that is conducted between customer 104 and merchant 102. For example, when paying for a transaction, customer 104 may provide the amount that is due to the merchant using cash or other payment instrument 112 (e.g., a debit card, a credit card, a stored-value or gift card, a check, through an electronic payment application on device 103 carried by the customer, or the like). The merchant may interact with POS device 105 to process the transactions, such as by inputting (e.g., manually, via a magnetic card reader, NFC reader, or an RFID reader, etc.) identifiers associated with payment instrument 112. For example, a payment instrument of the customer may include a card having one or more magnetic strips for providing card and customer information when swiped in a card reader. In other examples, other types of payment instruments may be used, such as smart cards having a built-in memory chip that is read by the device when the card is "dipped" into the reader, such as chips that comply with the Europay, MasterCard, Visa (EMV) standard, i.e. EMV cards. In other examples, other types of payment instruments include cards or computing devices that communicate via radiofrequencies such as a radiofrequency identification tags, and near field communication devices, etc.

During the transaction, POS device 105 may determine transaction information describing the transaction, such as the identifier of the payment instrument, an amount of payment received from the customer, the item(s) acquired by the customer, a time, place and date of the transaction, a payment network 140 associated with the payment instrument, an issuing bank of the payment instrument, a name or user account of the customer, contact information of the customer, type of the currency, and so forth. POS device 105 may send the transaction information to payment service 108 over network 110, either substantially contemporaneously with the conducting of the transaction (in the case of online transactions) or later when POS device 105 is in the online mode (in the case offline transactions).

In an offline transaction, POS device 105 may store one or more characteristics associated with the transaction (i.e., the transaction information), such as a cost of the transaction, a time of day at which the transaction occurred, a day of the week at which the transaction occurred, a location at which the transaction took place, an item that the customer obtained, an identity and/or contact information of the customer, and a payment instrument used in the transaction. After conducting an offline transaction with customer 104, POS device 105 may provide the stored information (or some subset of it) to the payment service 108 over the network 110. The network 110 may represent any one or more wired or wireless networks, such as a Wi-Fi network, a cellular network, or the like. In an online transaction, POS device 105 may send this information to payment service 108 over network 110 substantially contemporaneously with the transaction with the customer.

After merchant 102 receives the payment information from customer 104, merchant 102 may send respective authorization requests, along with information regarding the respective transactions, to payment service 108, as illustrated at 114. Payment service 108 may include payment processing service 126, merchant profiles 130, and customer profiles 132.

The payment processing service 126 may function to receive the information regarding a transaction from POS device 105 of merchant 102 and attempt to authorize the payment instrument used to conduct the transaction. Payment processing service 126 may then send an indication of whether the payment instrument has been approved or declined back to POS device 105, as illustrated at 116.

Generally, when a customer and a merchant enter into an electronic payment transaction, the transaction is processed by electronically transferring funds from a financial account associated with the customer to a financial account associated with the merchant. As such, the payment processing service 126 may communicate with one or more computing devices of a payment card network 140 (or "card payment network"), e.g., MasterCard®, VISA®, over network(s) 110 to conduct financial transactions electronically. Payment processing service 126 may also communicate with one or more computing devices of one or more banks, processing/acquiring services, or the like over the network 110. For example, payment processing service 126 may communicate with an acquiring bank, and/or an issuing bank, and/or a bank maintaining customer accounts for electronic payments. Payment processing service 126 may also communicate with, or access customer and merchant accounts maintained by payment service 108.

An acquiring bank may be a registered member of a card association (e.g., Visa®, MasterCard®), and may be part of a card payment network 140. An issuing bank may issue credit cards to buyers and may pay acquiring banks for purchases made by cardholders to which the issuing bank has issued a payment card. Accordingly, in some examples, the computing device(s) of an acquiring bank may be included in the card payment network and may communicate with the computing devices of a card-issuing bank to obtain payment. Further, in some examples, the customer may use a debit card instead of a credit card, in which case, the bank computing device(s) of a bank corresponding to the debit card may receive communications regarding a transaction in which the customer is participating. Additionally, there may be computing devices of other financial institutions involved in some types of transactions or in alternative system architectures, and thus, the foregoing are merely several examples for discussion purposes.

While FIG. 1 illustrates merchants 102 sending the transaction data directly to the payment service 108 as part of the request to authorize the payment instrument, in some instances other entities (e.g., banks associated with the merchants or with customer payment instruments) may provide transaction data, such as part of a batched, periodic process.

While customer profiles 132 may store indications of user preferences, merchant profiles 130 may store information associated with respective ones of the merchants 102. For instance, the merchant profiles 130 may indicate a class of items offered by respective merchants (e.g., coffee items, collectibles, apparel, etc.), a type of business of the merchant (e.g., restaurant, coffee shop, retail store, etc.), a geographical location of the merchant, and the like.

In some instances, a computing device associated with the merchant (e.g., POS device 105, servers of the merchant, etc.) may determine when the customer visits physical premises or a digital presence of the merchant. For instance, the device 103 of the customer 104 may include an application (e.g., an application provided by payment service 108) that communicates with POS device 105 of merchant 102 via near-field communication methods (e.g., Bluetooth, etc.). Therefore, when the customer visits the physical premises of merchant 102, for example, POS device 105 may detect the presence of customer device 103. The POS device may accordingly determine that the customer is present. In another example, one or both of POS device 105 and customer device 103 may share its location (e.g., GPS coordinates) to a common service for determining when the devices are located within a threshold proximity of one another, and for mediating a transaction between customer device 103 and POS device 105.

In another example, customer 104 may utilize customer device 103 to "check in" at the merchant location, and POS device 105 may receive an indication of this check in. When the customer visits a digital presence of merchant 102 (e.g., a website, etc.), customer 104 may log in or otherwise provide information (e.g., a cookie on the device 103) from which the merchant determines that the customer is at the merchant. Of course, while a few examples are listed, it is to be appreciated that the merchant and/or payment service 108 may determine when the customer is present at the merchant in any other number of ways. In each instance, after payment service 108 receives an indication that customer 104 is located at merchant 102, the payment service 108 may determine whether to send one or more previously expressed item preferences of the customer to the merchant.

In addition, customer 104 may desire to receive an instance of a payments application, such as a mobile wallet application, from the payment service 108. FIG. 1 illustrates, at 118, that the customer 104 may send payment-application requests to payment service 108. In response, at 120, payment service 108 may provide instances of the application back to customer device 103. In addition, payment service 108 may map an identification of the instance of the application to the customer profile.

Figure 2:
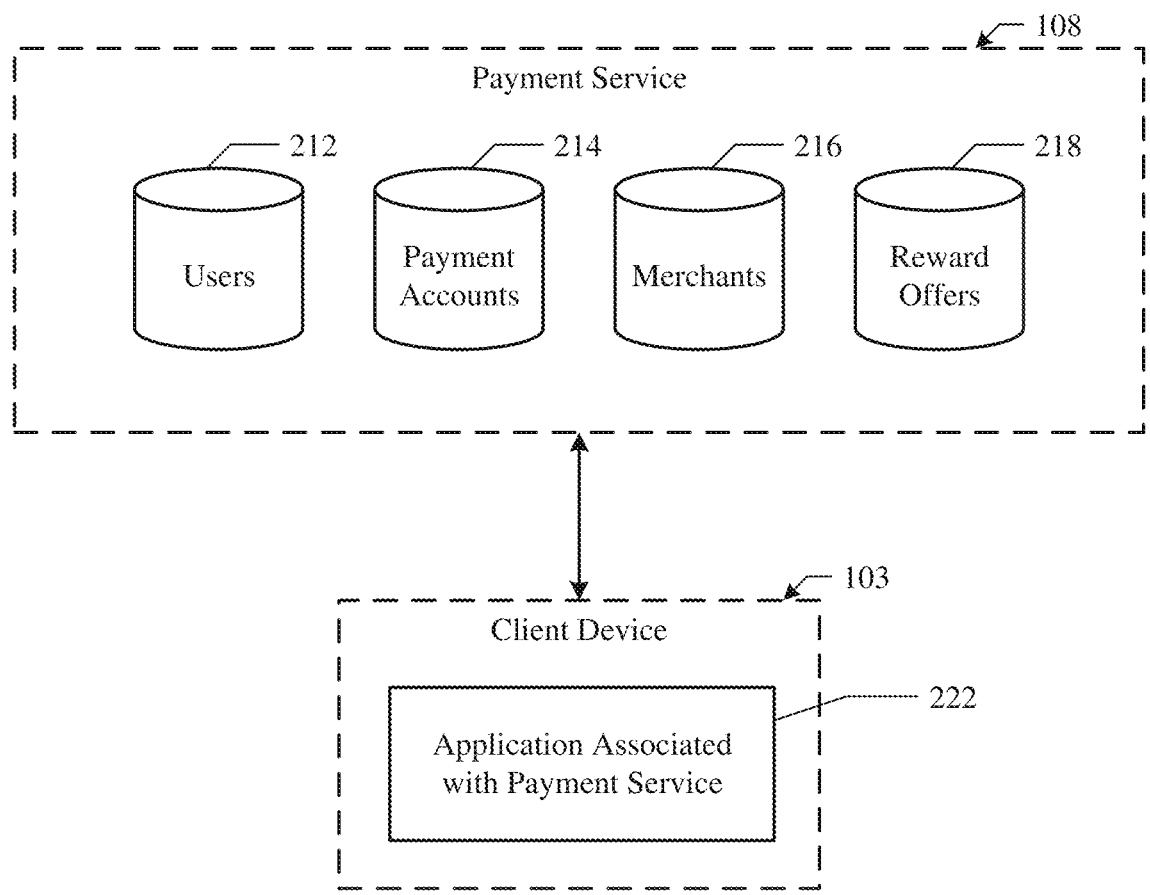
FIG. 2 illustrates an example system for providing payment cards and reward offers.

FIG. 2 illustrates an example system for providing payment cards and reward offers. In particular embodiments, the payment service system 108 may comprise one or more data stores. The data stores may comprise a data store 212 storing information associated with a plurality of users of the payment service. The information associated with a user may comprise biographical information, a transaction history comprising data about a plurality of transactions, a set of settings or preferences, a membership level or status, other suitable information, or any combination thereof. The data stores may comprise a data store 214. The data store 214 may store, for each of the users, information associated with a payment account issued by the payment service to the user. The payment account may be linked to one or more payment cards issued by the payment service to the user. A payment card may be represented by a physical card issued to the user. A user may make a payment using the physical payment card by, for example, swiping or inserting the card at a POS device. The payment card may also be represented by a card displayed in a user interface in a client device associated with the user. The user may directly make a payment using the virtual payment card (e.g., through near field communication (NFC) with a POS device using the user's mobile device). The data store 214 may store information about a balance or credit limit associated with the payment account, a usage history of the payment account, one or more reward offers connected to the payment account, a type of the payment account, other suitable information, or any combination thereof. The data stores may comprise a data store 216 storing information associated with a plurality of merchants. The information associated with a merchant may comprise biographical information, a location associated with the merchant, a type of business the merchant engages in, information about products or services offered by the merchant, a customer base of the merchant, customer reviews of the merchant, a transaction history, a history of promotions or offers, a rating, other suitable information, or any combination thereof. The data stores may comprise a data store 218 storing a plurality of reward offers. Each reward offer may be associated with at least one of the merchants. A reward offer may be applicable to one merchant, multiple merchants, a category of merchants, merchants of a particular location, or all merchants. A reward offer may cause a discount to the price of a product or service, a rebate after a payment is made, a gift to be given out, another suitable benefit, or any combination thereof. The data store 218 may store a value or percentage of price associated with each reward offer. The data store 218 may also store one or more criteria or conditions to be satisfied before a reward offer can be redeemed. Each reward offer may be associated with a time limit, a use duration or rate limit (e.g., once per hour) after which the reward offer is expired, or temporarily deactivated such that future payment actions (swipe, dip, tap) at the POS will not cause the reward to apply to the purchase. In particular embodiments, one or more of the data stores may store information associated with one or more connections between one or more reward offers with one or more payment accounts. Each connection may indicate an assignment by the user of a reward offer to the user's payment account.

In particular embodiments, the payment service system 108 may assign each merchant a category or classification. The payment service system 108 may also reclassify a merchant based on additional information. The category or classification assigned to the merchant may be stored in data store 216.

In particular embodiments, the payment service system 108 may analyze information embedded in the payment events (also referred to as situational features), such as operating hours, busy times, physical locations, item type, price range, the route that a merchant takes for their business operations, the payment activity while on the route, and the temporal, geospatial, sequential, and spectral properties of payment activity, to name a few. Such analysis and subsequent representation of analyzed information allows rich segmentation of merchants into classes, including but not limited to MCC type classes.

Accordingly, queries such as "how does loyalty affect customer retention when there are similar sellers nearby?", "which geographic areas are experiencing the most growth or decline?", "where are nearby events (farmers markets, food truck fairs, etc.)?" can be answered. Broadly speaking, such analysis can be applied to additional problem areas, for example, MCC labeling, risk modeling, metrics benchmarking and establishment, churn detection, optimization, seasonality detection, account takeover, new buyer or seller targeting, loyalty rewards, market analysis and segmentation, viral adoption, and the like.

In one implementation, the techniques described herein classify merchants into machine classifications by comparing information associated with the merchant using various machine-learning models which may not completely rely on any rules-based programming instructions or algorithms.

In other implementations, the merchants are classified into a number of classifications by analyzing the information associated with the information with other data, such as historical trends, other merchant data, and so on, using statistical models such as predictive and heuristic models. The model from data variables is formed in the form of mathematical equations and algorithms.

Thus, in the techniques described herein, reclassification of a merchant can include classifying a merchant in a number of clusters and/or reclassifying a merchant to a new class based on situational features defined by payment signals and data from itemization, location, common buyers, dynamic fingerprinting, and other such features, to create a seller intelligence platform.

A class is generally and traditionally based on a merchant category code (MCC) assigned to the merchant by one or more entities or based on revenue generated by the merchant. For example, credit card companies, a payment processing system, and/or another entity may classify a merchant using one of various MCCs. A merchant can be assigned within a MCC based on a type of items and/or services that the merchant provides. However, MCC or revenue-based classification is a one-dimensional and sometimes flawed way of merchant classification. MCC is a flawed framework for a few reasons. First, because MCC is self-reported during onboarding of the sellers, sellers are often mislabeled, possibly due to sellers' confusion.

In addition to unreliability due to self-reporting, traditional MCC is not rich enough to fully capture the contextual information about a seller, especially the seller's unique requirements (also referred to as Jobs) from the payment framework expressed, for example, through a 'Jobs To Be Done' (JTBD) framework. In the JTBD framework, the model factors not just the goods or service that is sold, but the situational features that define the Jobs a seller has. For example, a caterer and a T-shirt printer would be classified as 'food and drink' and 'retail' under MCC but may look very similar in terms of payment products used (invoices, mobile reader) and payment activity (infrequent CNP transactions with high dollar amount in a variety of locations). One of the largest MCCs is 'food and drink,' which really includes sellers with very different JTBD, for example quick-serve and full-serve restaurants. From both a JTBD (and credit risk) perspective, MCCs group some dissimilar sellers and fail to connect other similar sellers.

To this end, the embodiments described herein first, obtain situational features from the merchant's payment activity, for example based on spatio-temporal data points and/or itemization data, and second, analyze the situational features to enable richer merchant insights, classification or reclassification of a merchant in itemization topics, predicted MCCs, and JTBD clusters, where the JTBD clusters can have flexible boundaries, retention analysis, risk analysis, cross-sell, and the like. The classification or reclassification can be based on models that execute automation using one or a combination of heuristic statistical models, machine-learning models such as supervised and unsupervised models, and deep learning models.

Machine learning models are used to create cluster sellers, for example by JTBD, in a more intelligent way than the MCC and revenue-based segmentation. For example, in one implementation, the methods and systems implement a Latent Dirichlet Allocation (LDA) model to itemization data to create itemization topics and itemization names. Reclassification of sellers is then accomplished by executing a Random Forest Classification model that predicts a seller category based on real-time data and historical data. After engineering an intuitive set of contextual features that define a seller's JTBD, the system implements an unsupervised clustering algorithm that takes these features as input and outputs the seller's most probable cluster. These clusters can be correlated to MCC since most clusters have only one or two MCCs overrepresented but can also illuminate similarities across MCCs and differences within MCCs. For example, a cluster with high card not present transactions, mobile payments, payment a few times a day, and sole professionals might have mostly home and repair and professional services MCC. Another cluster might consist of only Quick Service Restaurants (QSRs), well defined by the payment activity, while some full-service restaurants (FSRs) might be clustered with retail sellers.

In another implementation, the systems and methods apply statistical models to form relationships between variables in the data in the form of mathematical equations. For example, the historical data is analyzed to extract temporal features, location-based features, sequential features, and spectral features emitted by the business in the course of their operations.

Deep learning models have been used for encoding contextual similarity between a variety of objects like words, images, drawings, and even 3D shapes. These models encode the complexity as a high-dimensional vector such as word2vec. Those vectors are extremely useful in that they define an immediately useful concept of similarity between objects. Things like 'coffee'~'cafe' or 'image of bicycle'~'image of unicycle.' In some implementations, deep learning models can be used to learn a vector representation of each merchant.

These vector representations are usually learned in a particular context, such as in the course of predicting a certain classification problem. The deep learning models can be used to influence the context by choosing what classes are learned to select, for example by using a soft max versus metric learning approach. The deep learning models can also be used to predict merchant type and take the learned vectors for more general use. Those vectors should encode similarity in terms of roughly what kind of business the seller does and learn these encodings in an unsupervised way. Such deep learning models, as described before, can be used to define "neighbors," and within what distance from the point do these neighbors lie. Furthermore, the models are used to cluster by discovering structure and pattern around the sellers. The models can be further improved by adding representation as features, adding clusters as categorical features and using clusters to impute data.

To identify the MCCs and JTBD clusters for a specific merchant, a payment service system 108 (and/or other service) can collect merchant signals for the merchant. Merchant signals for a merchant may include reported data, collected data, training data, and third-party data associated with the merchant. For example, the payment service system 108 can receive reported data from a point-of-sale (POS) device 105 of a merchant and/or an online merchant interface to the payment service system 108 that is accessible by the merchant. The reported data can indicate a selected class for the merchant, a business name of the merchant, a set of items offered by the merchant (e.g., inventory items), and/or a geographical location of the merchant.

The payment service system 108 can further receive collected data from the POS device 105 of the merchant. The collected data can indicate transactional information for the merchant, such as classes of items acquired by customers from the merchant and payment activity for the merchant. Payment activity for the merchant may include tips the merchant receives, ticket sizes for the merchant, volumes of item and/or service provided (e.g., sold, rented, leased, etc.) by the merchant, a time of day for providing items and/or services, or other sorts of data corresponding to transactions for the merchant.

The payment service system 108 can generate training data comprising (a) the stored historical transaction data; (b) an indication, for each historical purchase transaction, of whether the purchase transaction was ultimately determined to be fraudulent; and (c) a classification of a merchant associated with the transaction and/or business. For example, all transactions related to coffee may be the subject of a specific classification. In addition, for historical purchase transactions that were manually reviewed by human analysts, the training data may indicate whether the classification was changed from classification A to classification B.

Additionally, the payment service system 108 can receive third-party data associated with the merchant from one or more third-party services. For instance, the payment service system 108 can receive an email address for the merchant from an email service or provider (and/or POS device 105 of the merchant), merchant reviews for the merchant from a review service or provider (e.g., blogging service), and/or other sorts of third-party data associated with the merchant. The payment service system 108 can then generate a business profile for the merchant that includes the reported data, the collected data, and the third-party data, and use the data included in the business profile to classify the merchant in a class and/or reclassify the merchant to a new class.

For instance, the payment service system 108 can compare data in the business profile of the merchant to a collection of class profiles. Each class profile may be associated with a classification (e.g., MCC) and include data about the class and/or data about merchants that are assigned to the class. For example, the data may include one or more words that merchants assigned to the class commonly use in their business names (e.g., "pub" for merchants that are classified as bars). The data may further include a cluster of items associated with the class (e.g., items offered by the merchants assigned to the class, items acquired by customers from the merchants assigned to the class, etc.), payment activity for merchants assigned to the class (e.g., tips the merchant receives, ticket sizes for the merchant, volumes of items sold by the merchant, time of day for sales of items and/or services), and/or geographical locations of the merchants assigned to the class. The payment service system 108 can determine the data based on information that is common to the class and/or the payment service system 108 can receive the data from merchants that are assigned to the class.

In one implementation, in capturing the contextual features of a merchant, the methods and systems train an LDA topic model using sellers' itemization text to cluster sellers who provide similar goods and services.

In another implementation, in comparing data from the business profile of the merchant to the class profiles, the payment service system 108 can identify one or more class profiles that are similar to the business profile of the merchant. For example, the payment service system 108 can identify class profiles that include business names that are similar to the business name of the merchant. Similar business names can include one or more words that are common between the business names. For instance, the business name of the merchant may include the word "pub." The payment service system 108 can then identify class profiles that include merchants that also use the word "pub" in the merchants' business names. The payment service system 108 can then determine that the business profile of the merchant is similar to those identified class profiles.

For another example, the payment service system 108 can identify one or more class profiles based on the one or more class profiles including transactional information that is similar to the transactional information of the merchant. For instance, the payment service system 108 can identify class profiles that include the same and/or similar cluster of items as the cluster of items offered by the merchant, the same and/or similar cluster of items as the cluster of items acquired by customers from the merchant, and/or payment activity that is within a threshold value as the payment activity of the merchant. As discussed above, the payment activity for a merchant may include a percentage of tips that the merchant receives, ticket sizes for the merchant, and/or volumes of items customers acquire from the merchant.

For example, the payment service system 108 can identify class profiles that are similar to the business profile of the merchant based on the class profiles including a revenue that is within a threshold revenue (e.g., within a set percentage or range) as revenue of the merchant. For another example, the payment service system 108 can identify class profiles that include a number of tips (e.g., total tip amount and/or percentage of revenue that includes tips) that is within a threshold tip (e.g., within a set percentage or range) as a number of tips of the merchant. Additionally, the payment service system 108 can further perform similar methods to identify class profiles that include similar ticket sizes as the merchant and/or similar volume sizes of acquired items as the merchant.

When using a threshold to determine similarities between class profiles and the business profile of the merchant (and/or data included in the business profile of the merchant), the payment service system 108 and/or another entity can set a threshold value. For example, the payment service system 108 and/or other entity can set the threshold to include a specified percentage, such as 50%, 75%, 90%, 100%, or the like. For another example, the payment service system 108 and/or other entity can set the threshold to include a specified value range. For instance, when using revenue, the payment service system 108 can set ranges that include $100,000-$200,000 a month, $750,000-$1,000,000 a year, or the like.

The payment service system 108 can further use the third-party data to identify the one or more class profiles that are similar to the business profile of the merchant. For example, the payment service system 108 can determine classes of items acquired by customers from the merchant based on customer reviews that are associated with the merchant. The payment service system 108 can then use that determination to identify class profiles that include the cluster of items. For another example, the payment service system 108 can use the email address of the merchant to identify one or more class profiles that are similar to the business profile of the merchant. For instance, if the email address for the merchant ended with @myrestaurant.com, the payment service system 108 can determine that the merchant is a restaurant and use that determination to identity class profiles that are associated with restaurants.

After identifying the one or more class profiles that are similar to the business profile of the merchant, the payment service system 108 can either classify the merchant using a class corresponding to one of the class profiles or reclassify the merchant to a new class. When classifying and/or reclassifying a merchant with a class, the payment service system 108 can base the determination using one or more rules.

For instance, the payment service system 108 can use rules that select the class from the one or more identified classes based on fees charged to the merchant. For example, credit card companies and/or other entities may require the merchant to pay different rates (e.g., fees) based on which class (e.g., MCC) is assigned to the merchant. As such, the payment service system 108 can determine fees that will be charged to the merchant for each of the identified classes and rank the classes based on the fees. The payment service system 108 can then use a rule that selects the class that charges, for instance, the least amount of fees to the merchant.

Besides rules based on fees to the merchant, the payment service system 108 can implement a rule that prioritizes selection of certain classes over other classes. For example, if the payment service system 108 determines that a particular merchant may fairly be associated with a first class "restaurants" and a second class "bars", the payment service system 108 may select the more inclusive class, which in this case comprises the first class "restaurants".

Additionally, the payment service system 108 can allow the merchant to select a class from the one or more identified classes. For instance, the payment service system 108 can send a message indicating the identified classes to the POS device 105 of the merchant. The POS device 105 can then provide the merchant with an interface that includes the identified classes for selection. In response to a merchant selection of a class using the interface, the POS device 105 can then send a message indicating the selection to the payment service system 108 so that the payment service system 108 can classify and/or reclassify the merchant using the selected class.

In reclassifying a merchant, the payment service system 108 can perform the techniques described above at given time intervals. For instance, the payment service system 108 may continue collecting data associated with the merchant and update the business profile of the merchant using the data. The payment service system 108 can then use the data included the updated business profile of the merchant to determine whether the merchant is classified in the correct class at each given time interval. For example, the payment service system 108 can make the determination each week, month, year, or some other give time period.

Although the techniques described describe reclassifying the class of the merchant, the payment service system 108 can alternatively determine not to reclassify the merchant based on the identified class profiles. For instance, the payment service system 108 can determine that the current class of the merchant accurately represents the merchant. As a result, the payment service system 108 can determine not to reclassify the merchant into a new class.

Additionally, while the above provides classifying and/or reclassifying a single merchant to a class, the described techniques can classify and/or reclassify any number of merchants using the examples described above. For instance, the payment service system 108 may generate profiles for more than one merchant and compare each of the profiles to the class profiles associated with the various classes. The payment service system 108 can then identify one or more merchants that are classified in the wrong class and/or classified in a class that is not beneficial to the merchant. In response, the payment service system 108 can flag these merchants and either reclassify the merchants to a new class or provide the merchants with alternative classes for the merchants' selections.

Furthermore, while the techniques described above are illustrated as being performed by the payment service system 108, in other instances, the POS device 105 of the merchant can collect the data associated with the merchant, generate a business profile for the merchant using the data, compare the data included in the business profile of the merchant to the class profiles, and classify and/or reclassify the merchant based on the comparison. The POS device 105 can then send a message indicating the class to the payment service system 108 and/or another service (e.g., one or more credit card companies).

Even though the description herein uses classification and reclassification of merchants as an application, it will be understood that the systems and methods described herein can be implemented for other applications, such as risk modeling, establishment of metrics, churn detection, business operations optimization, detection of seasonality, account takeover, existing buyer targeting, new buyer targeting, loan or capital advancing, loyalty magnetism, retention analysis, merchant targeting with products, market analysis and segmentation, and viral adoption. To this end, instead of merchant classification, the machine learning model may look for some other kind of commonality and cluster the merchants or customers accordingly. Furthermore, even though the present subject matter uses payments as an example, the idea can be implemented in other fields such as advertising, marketing, banking and investments, just to name a few.

Furthermore, once the merchants are classified or understood in a contextual way, the use cases of the segmentation application include, but are not limited to: cross-selling to give a more granular way to sell the right products with highlights on particular features; differentiating between QSR and FSR within restaurants; applying reclassified MCCs for invoice financing, evaluate credit risk, e.g., cluster pre-sale merchants together, suggesting specific close of days by day of the week of merchants want their day's transactions batched into a single deposit, and other business vertical specific POS use cases.

Some implementations described herein implement machine learning models, while others implement heuristic models, and yet others implement a combination of the two. For example, in one implementation, both the models can be implemented and the results from the models compared and weighted to pick one or a combination of the results.

While some implementations described herein use payment activity as a basis for MCC classification, it would be understood that other factors may be used either in combination with payment activity or alone. For example, in one implementation third party data, such as data obtained by crawling a merchant's website can be used for merchant classification, especially when payment activity is under a threshold.

The methods and systems disclosed above describe an automated and more accurate classification within the merchant database thereby reducing the computing steps necessary for a merchant to classify their own business (e.g., multiple classification attempts) and the likelihood of an incorrect classification that may result in higher processing fee or violation of other legal requirements. For example, certain MCCs need to meet HIPAA requirements, etc., and the system described above detects the appropriate MCC based on payment behavior and not merchant's discretion. Also, since the credit card companies tie their rewards to MCCs, an incorrect classification may cause incorrect allocation of credit card points and rewards, but implementing the disclosed system and method helps alleviate such problems. Furthermore, present subject matter greatly reduces memory consumption through auto-reclassification in the event merchant was classified in multiple categories in the database. In another scenario, the present subject matter classifies in a category that changes dynamically as the merchant interacts with the payment service and customers. In yet another scenario, the same merchant can be in multiple clusters to allow the system to process the merchant's activity in multiple ways and through multiple perspectives. For example, in parallel, or substantially contemporaneously, the merchant may be presented with a product suggestion and a loan advance in response to the same transaction, because the merchant is classified in two seemingly different clusters.

In particular embodiments, the payment service may comprise data for provisioning an application 222 associated with the payment service for installation on a client device 103 associated with each of a plurality of users. The application 222 may be installed and operated on the client device 103 with request or permission by the respective user. The application 222 may communicate with the payment service system 108 via a network. The application 222 may provide various information for display in one or more user interfaces. The information displayed may comprise, for example, user information, account information, information about funds in a payment account, information about one or more social connections, information about one or more user settings or preferences, other suitable information, or any combination thereof. In particular embodiments, the application 222 may provide for display a virtual payment card issued to the user and associated with the payment account of the user. The virtual payment card may mimic the shape and form of a regular debit or credit card. The virtual payment card may also be displayed in any suitable shape, color, or size. The virtual payment card may correspond to a physical payment card issued to the user by the payment service. Although FIG. 2 illustrate a particular system for providing payment cards and reward offers, this disclosure contemplates any suitable system for providing payment cards and reward offers.

Figure 3A:
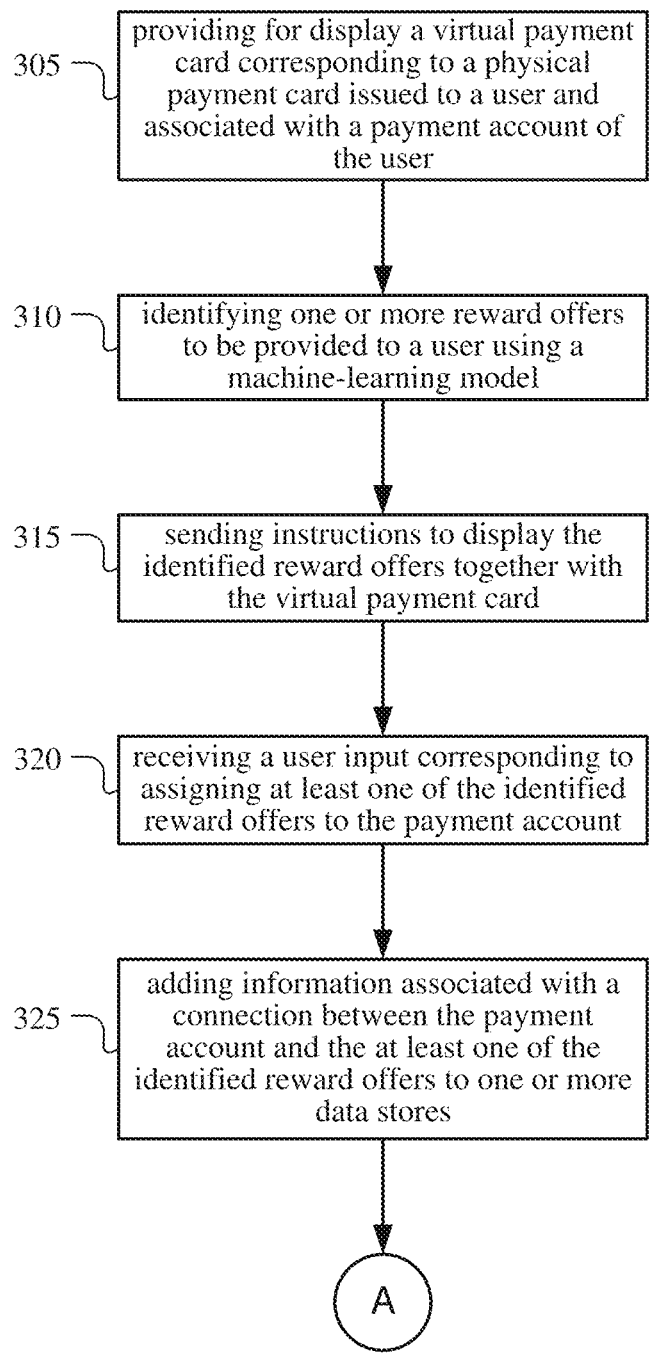
FIG. 3A illustrates an example method for identifying reward offers and connecting reward offers to a payment card.

FIG. 3A illustrates an example method 300a for identifying reward offers and connecting reward offers to a payment card. The method 300a may begin at step 305, where a payment service system 108 may provide for display a virtual payment card in a user interface of an application 222 running on a client device 103 of a user. The virtual payment card may correspond to a physical payment card issued to the user. The virtual payment card and the physical payment card may both be associated with a payment account of the user.

At step 310, the payment service system 108 may identify one or more reward offers to be provided to the user. The reward offers may be identified using a machine-learning models based on information in one or more data stores associated with the payment service system 108. The information analyzed by the machine-learning model to identify reward offers may comprise information about one or more users, information about one or more payment accounts, information about one or more merchants, information about one or more existing and available reward offers, other suitable information, or any combination thereof. For example, the information used to identify the reward offers may comprise demographic information associated with the user, information associated with a current time, information associated with a location of the user, historical information associated with use of the application 222 by the user, information associated with input by the user while using the application, or information associated with a membership status of the user.

As an example and not by way of limitation, the payment service system 108 may determine it is a user's birthday and provide one or more reward offers for birthday-related products. As an example and not by way of limitation, the payment service system 108 may identify a plurality of reward offers related to Christmas for provision to a plurality of users during a year-end holiday season. As an example and not by way of limitation, the payment service system 108 may receive a message from a merchant about a particular promotional period and discounts provided by the merchant during the period. Based on the message, the payment service system 108 may push out reward offers representing the discount to a plurality of users during the promotional period. As an example and not by way of limitation, the payment service system 108 may determine that a particular product or service offered by a particular merchant is trending at a point in time. The payment service system 108 may push out one or more reward offers associated with the product or service to a plurality of users. As an example and not by way of limitation, the payment service system 108 may determine from a purchase history of a user that the user has repetitively made payments at a particular category of merchants, the payment service system 108 may provide the user targeted reward offers for merchants in this same category. As an example and not by way of limitation, the payment service system 108 may determine that a user has not used the payment card for a while. The payment service system 108 may provide the user a reward offer containing a credit that is applicable to any payment made using the payment card to motivate the user to use the payment card. For example, the reward offer may provide the user a $5 credit that can be redeemed against a payment made by the user using the payment card to any merchant, as long as the payment is made within the next ten days. As another example and not by way of limitation, the payment service system 108 may detect a location of a user through the application 222 and push to the user one or more reward offers for merchants nearby. As yet another example and not by way of limitation, the payment service system 108 may determine a reward offer accepted by the user has expired and present a similar reward offer extending the term of the previously-accepted reward offer.

In particular embodiments, one or more reward offers provided to a user may be determined based on a membership status of the user. In particular embodiments, the payment service system 108 may assign a membership status (e.g., Platinum, Gold, Silver) to a user's payment account based on a plurality of factors associated with the user. The factors for a user may comprise, for example, a profile, an age, a location, a gender, a birth date, an address, a spending history, a merchant interaction history, a reward offer usage history, a user-to-user transaction history, results of a natural-language analysis of posts by the user (e.g., text, image, emojis). In particular embodiments, the payment service may determine a number of reward offers that a user may link to her payment account based on the user's membership status (e.g., 10 for Platinum users, 5 for Gold users, and 3 for Silver users). In particular embodiments, the payment service may customize a reward offer based on a user's membership status (e.g., 20% discount for Platinum users, 15% discount for Gold users, and 10% discount for Silver users). The payment service system 108 may provide for display one or more animation effects in one or more user interfaces when a user's membership status is upgraded.

At step 315, the payment service system 108 may send, to the client device 103 associated with the user, instructions to display the identified reward offers together with the virtual payment card in a user interface of the application 222. Each of the reward offers displayed may contain information about the content of the offer, a merchant associated with the offer, an expiration date of the offer, other suitable information about the offer, or any combination thereof. The application 222 may display multiple reward offers on a same screen or may display the reward offers one at a time and allow the user to scroll or flip through them. The user interface of the application 222 that displays the reward offers may comprise one or more interactive elements (e.g., buttons) allowing a user to accept or dismiss a reward offer. The user interface may also be configured to accept one or more gestures by the user to perform actions on the reward offers.

At step 320, the payment service system 108 may receive, from the client device 103, a user input indicating an assignment of at least one of the identified reward offers to the payment account. In particular embodiments, the user input may comprise a touch-screen gesture in a user interface. The touch-screen gesture may interact with the at least one of the reward offers or the virtual payment card. As an example and not by way of limitation, the user may select a reward offer, drag it and drop it on the displayed virtual payment card to indicate assignment of the reward offer to the payment account. This gesture may be detected by the client device 103 and forwarded to the payment service system 108. In particular embodiments, the payment service system 108 may require one or more user actions before a reward offer can be accepted. As an example and not by way of limitation, a user may be required to share a reward offer with one or more friends to enable it. The payment service system 108 may determine that a reward offer is enabled based on one or more signals indicating one or more required activities by the user.

At step 325, the payment service system 108 may add, to one or more of the data stores, information associated with a connection between the payment account and the at least one of the identified reward offers. The connection may authorize redeeming the reward offer upon payment for a subsequent transaction using the physical payment card. Alternatively, the reward offer may be redeemed when the virtual payment card is directly used for a payment, for example, at a point-of-sale of a merchant via an NFC-enabled card reader or similar mechanism.

In particular embodiments, after establishing and storing information about a connection between the payment account and a reward offer, the payment service 108 may cause representation of the connection in a user interface of the application 222. The payment service system 108 may send, to the client device 103, instructions to modify the displayed virtual payment card to reflect the connection between the payment account and the at least one of the identified reward offers. As an example and not by way of limitation, the application 222 may display a logo of a merchant associated with the reward offer on top of the virtual payment card or change the color of the virtual card so as to indicate the connection between the reward offer and the virtual payment card.

In particular embodiments, a user may dismiss a reward offer after it has been linked to a payment card. The user may perform one or more actions in a user interface displayed by the application 222 to dismiss a reward offer (e.g., touching an "x" displayed next to the reward offer). The payment service 108 may receive a user input corresponding to dismissing one of the identified reward offers. The payment service system 108 may then remove the information associated with the connection between the payment account and the reward offer from the one or more data stores. The payment service system 108 may also send, to the client device 103, instructions to remove the one of the identified reward offers from the user interface.

Although this disclosure describes and illustrates particular steps of the method of FIG. 3A as occurring in a particular order, this disclosure contemplates any suitable steps of the method of FIG. 3A occurring in any suitable order. Moreover, although this disclosure describes and illustrates an example method for identifying reward offers and connecting reward offers to a payment card including the particular steps of the method of FIG. 3A, this disclosure contemplates any suitable method for identifying reward offers and connecting reward offers to a payment card including any suitable steps, which may include all, some, or none of the steps of the method of FIG. 3A, where appropriate. Furthermore, although this disclosure describes and illustrates particular components, devices, or systems carrying out particular steps of the method of FIG. 3A, this disclosure contemplates any suitable combination of any suitable components, devices, or systems carrying out any suitable steps of the method of FIG. 3A.

Figure 3B:
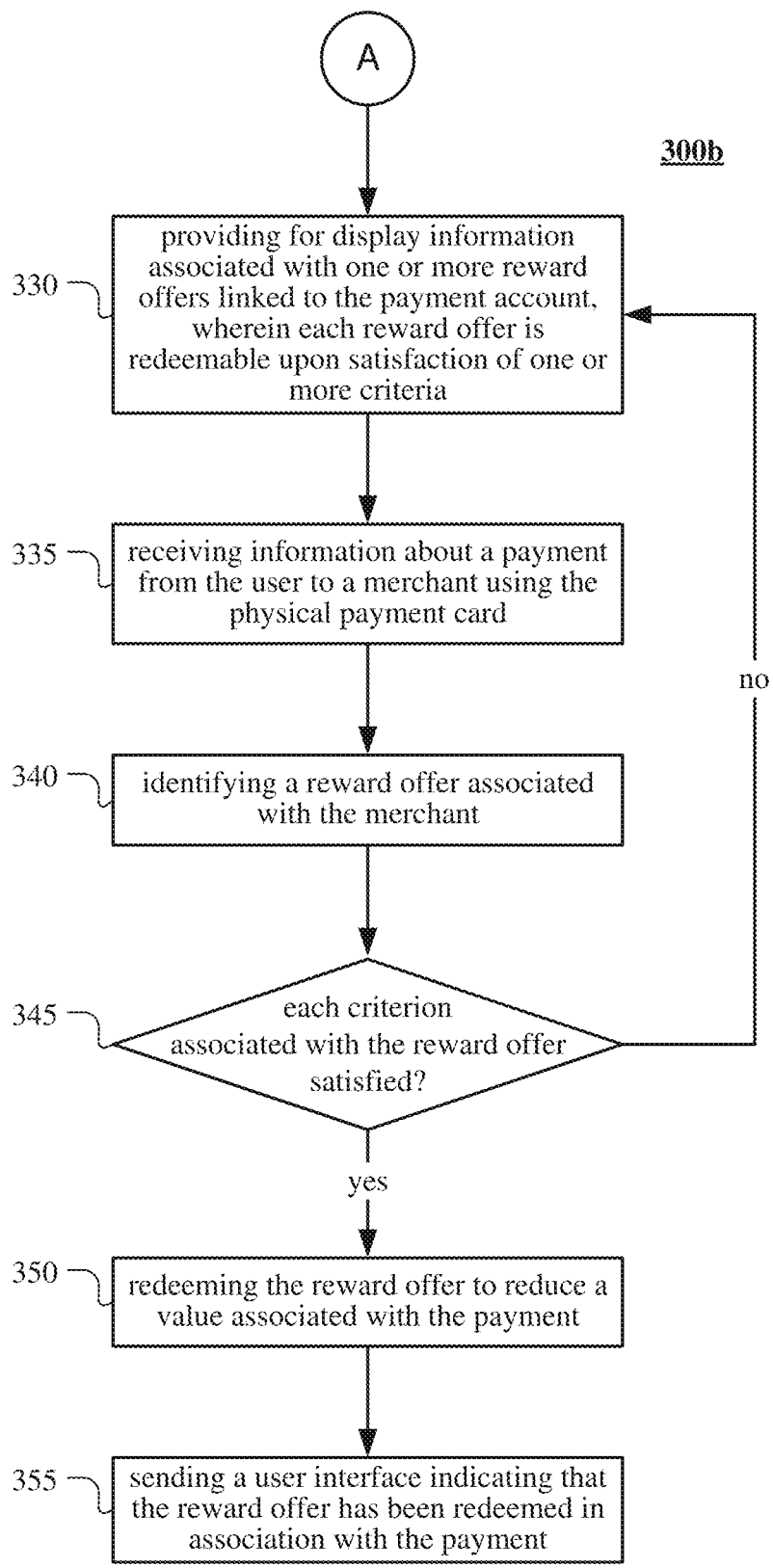
FIG. 3B illustrates an example method for redeeming a reward offer in response to a payment using the payment card.

FIG. 3B illustrates an example method 300b for redeeming a reward offer in response to a payment using the payment card. The method 300b may comprise one or more steps subsequent to the one or more of the steps of the method 300a. The method 300b may begin at step 330, where the payment service system 108 may provide through the application 222 for display information associated with one or more reward offers linked to the payment account associated with the user. Each of the reward offers may be redeemable upon satisfaction of one or more criteria. In the same user interface, the payment service system 108 may provide for display a virtual payment card corresponding to a physical payment card issued to the user and associated with the payment account.

At step 335, the payment service system 108 may receive information about a payment from the user to the merchant using the physical payment card issued to the user. The information about the payment may be received from an instance of the application 222 installed on a client system 103 associated with a user or a third-party system 105 associated with a merchant. In particular embodiments, the user may make the payment directly using the virtual payment card. The payment may be made by placing the client device 103 storing information about the virtual payment card in proximity to an NFC terminal associated with the merchant. In this case, either the client device 103 associated with the user or a device 105 associated with the merchant may send information associated with the payment to the payment service system 108. In particular embodiments, the user may make the payment using a physical payment card associated with the payment account. The payment may be made by placing the physical payment card in contact (e.g., swipe, insert) with a POS device 105 associated with the merchant. In this case, the POS device 105 may send information associated with the payment to the payment service system 108 via a network. The information may be forward to the client device 103 associated with the user.

At step 340, the payment service system 108 may identify a reward offer linked to the user's payment account that is applicable to the merchant to whom the payment was made. In particular embodiments, the payment service system 108 may search through all reward offers linked to the user's payment account to identify such a reward offer. If such a reward offer is identified, the payment service system 108 may proceed to step 345, where the payment service system 108 may determine, based on the information about the payment and transaction data, and the information stored by the one or more data stores, whether each criterion associated with a reward offer linked to the payment account has been satisfied. As an example and not by way of limitation, the payment service system 108 may first determine that the payment is made to the merchant that is associated with the reward offer. As another example and not by way of limitation, the payment service system may determine that the payment was made within a required time period, that a required product was purchased with the payment, that the payment exceeded a required minimum value, that the payment was made using a desired method, that another suitable criterion has been satisfied, or any combination thereof. If the payment service system 108 determines that each criterion associated with a reward offer is satisfied, it may proceed to step 350. Otherwise, it may return to step 330.

At step 350, the payment service system 108 may automatically redeem the reward offer to reduce a value associated with the payment. In particular embodiments, the value associated with the payment may be directly reduced by a percentage or amount of money. Alternatively, the value may be indirectly reduced through a rebate. In particular embodiments, the payment service system 108 may send information to the point of sale of the merchant indicating that the reward offer has been redeemed to cause the merchant to charge a reduced price. Alternatively, the payment service system 108 may reduce the value of the payment and later resolve the reduced value with the merchant. In particular embodiments, the payment service system 108 may redeem a reward offer after a delay in time. As an example and not by way of limitation, the payment service system 108 may send to a user a reward offer that would apply to payments to a particular category of merchants (e.g., coffee merchants). The user may have made a qualifying payment to a merchant of the category (e.g., a local coffee shop). However, the payment service system 108 initially may not recognize the merchant as qualifying and may not redeem the reward offer on the qualifying payment. One or more user interfaces of the application 222 may comprise one or more interactive elements allowing the user to report issues related to redemption of reward offers. The interactive elements may be associated with the reward offers or a displayed purchase history of the user. The payment service system 108 may receive a message or notification from the client device 103 of the user indicating that the reward offer should have but was not applied. The message or notification may be triggered by one or more user inputs in the application 222. In response to the message or notification, the payment service system 108 may retroactively apply a discount associated with the reward offer to the payment, which may result in an increase to the user's account balance.

At step 355, the payment service system 108 may send, to the application 222 installed on the client device 103, a user interface indicating that the reward offer has been redeemed in association with the payment. In particular embodiments, the application 222 may display one or more animation effects on the user interface in association with the virtual payment card to indicate that a reward offer has been redeemed (e.g., virtual payment card changes to a color associated with the merchant or reward type). In particular embodiments, the user interface may comprise a receipt for the payment. The receipt comprising information associated with the redemption of the reward offer. In particular embodiments, the payment service system may add information associated with the redemption of the reward offer to a transaction history associated with the user. It may send, to the application 222, a user interface displaying at least part of the transaction history. In particular embodiments, a membership status of the user may be determined based on the user's transactions history. For example, the membership status may be upgraded if the total amount of payments made by the user exceeds a threshold or if the total number of reward offers redeemed for the user exceeds a required number.

In particular embodiments, a reward offer may be associated with limitations such as a number-of-uses limit (e.g., five times), a time duration (e.g., one week), or a rate limit (e.g., once a day). The reward offer may be deactivated or delinked from a corresponding payment account if its limitations are reached. In particular embodiments, after a reward offer is redeemed for a number of times that equals a corresponding maximum value, the payment service system 108 may delink the reward offer from the corresponding payment account. The payment service system 108 may remove information about the connection between the reward offer and the payment account from one or more of the data stores. In particular embodiments, the reward offer may be delinked from the corresponding payment account as soon as the offer is redeemed on a payment using either the physical payment card or the virtual payment card associated with the payment account, such that an attempt to redeem the reward offer for another payment using an alternative card associated with the same payment account would be denied. In particular embodiments, the payment service system 108 may automatically deactivate a reward offer or delink it from the payment account when a time duration associated with the reward offer has passed, regardless of whether the reward offer has been redeemed. In particular embodiments, the payment service system 108 deactivate a reward offer after it has been redeemed for a certain number of times in a particular period. For example, a reward offer may be deactivated after being used once in a particular day and re-activated the next day for another redemption.

Although this disclosure describes and illustrates particular steps of the method of FIG. 3B as occurring in a particular order, this disclosure contemplates any suitable steps of the method of FIG. 3B occurring in any suitable order. Moreover, although this disclosure describes and illustrates an example method for redeeming a reward offer in response to a payment using the payment card including the particular steps of the method of FIG. 3B, this disclosure contemplates any suitable method for redeeming a reward offer in response to a payment using the payment card including any suitable steps, which may include all, some, or none of the steps of the method of FIG. 3A, where appropriate. Furthermore, although this disclosure describes and illustrates particular components, devices, or systems carrying out particular steps of the method of FIG. 3B, this disclosure contemplates any suitable combination of any suitable components, devices, or systems carrying out any suitable steps of the method of FIG. 3B.

Figure 4:
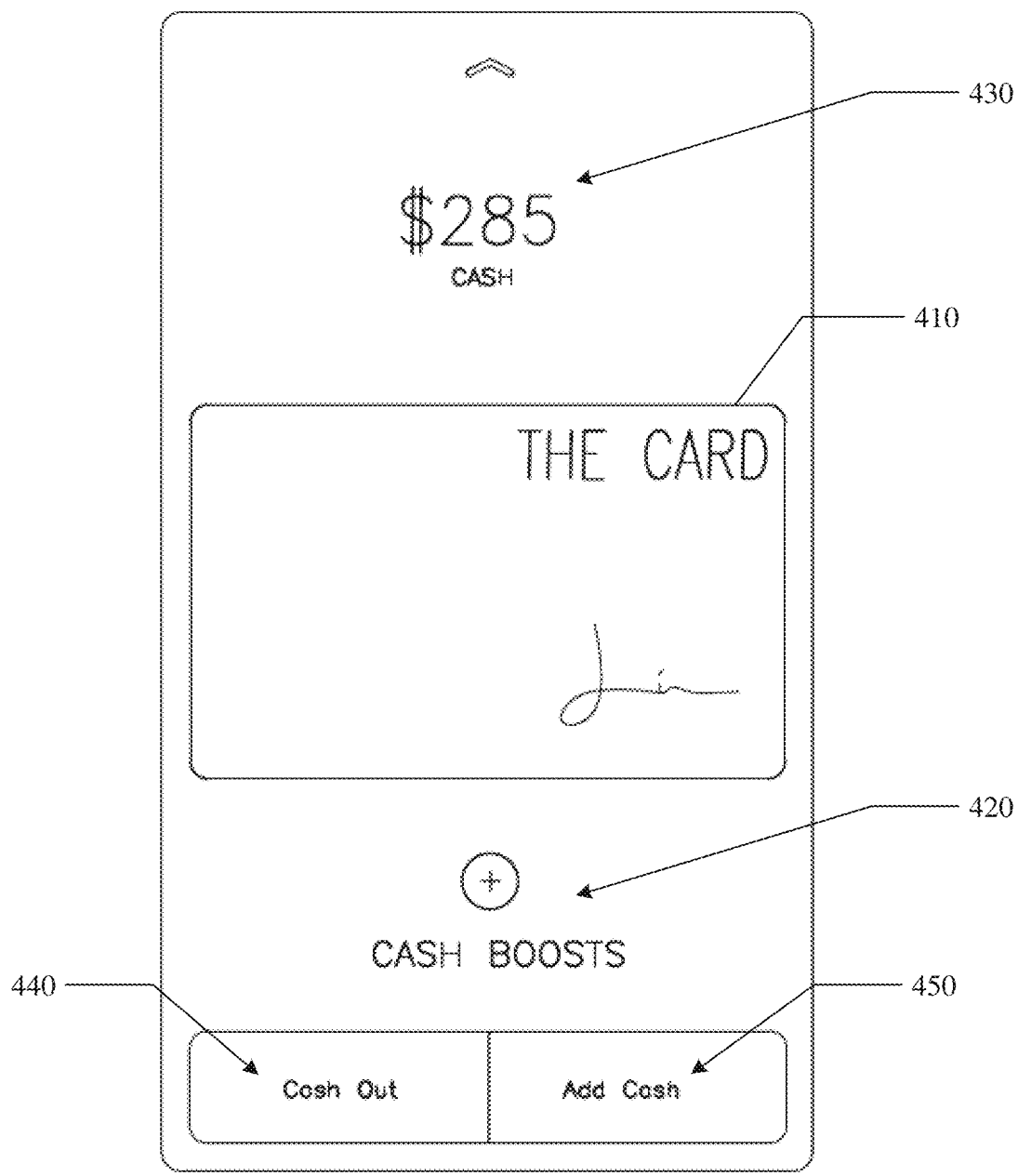
FIG. 4 illustrates an example user interface displaying a virtual payment card.

FIG. 4 illustrates an example user interface 400 displaying a virtual payment card. In particular embodiments, the payment service system 108 may send a user interface 400 to a client system 103 associated with a user for display. The user interface 400 may be displayed via the application 222 provisioned by the payment service system 108. The user interface 400 may comprise a representation of a payment account associated with the user. The payment account may be associated with a virtual payment card 410 displayed in the user interface 400. The user interface 400 may comprise an interactive element 420. The user may interact with the interactive element 420 and be directed to a user interface (e.g., user interface 500 displayed in FIG. 5A) presenting one or more reward offers (e.g., called "cash boosts" in this example). The user interface 400 may also comprise one or more additional elements corresponding to the payment account, such as a balance of the payment account 430, a button 440 for withdrawing money from the payment account, and a button 450 for depositing money to the payment account.

Figure 5A:
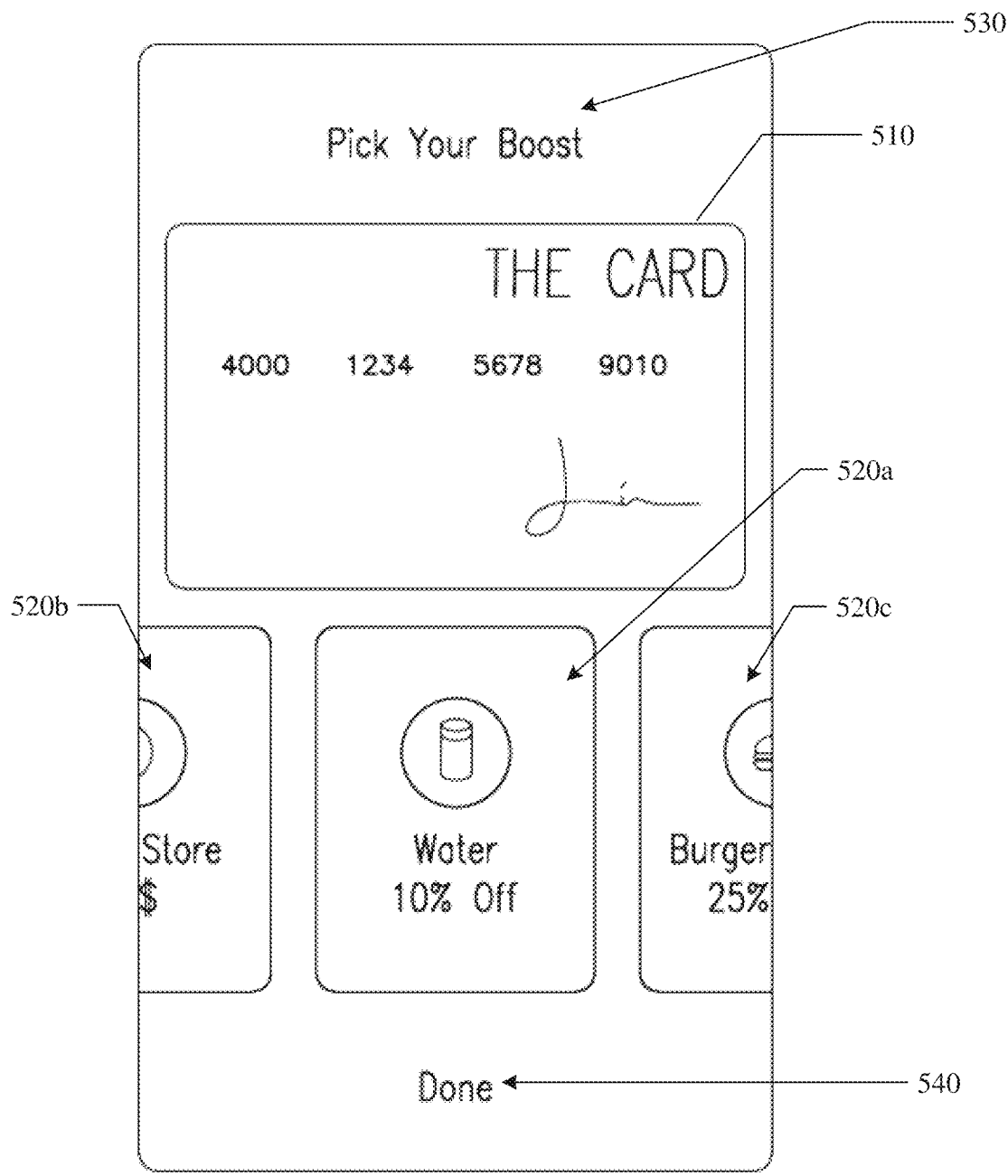
FIG. 5A illustrates an example user interface providing one or more reward offers for selection.

FIG. 5A illustrates an example user interface 500 providing one or more reward offers for selection. In particular embodiments, the user interface 500 may comprise a field 510 representing the virtual payment card. The user interface 500 may comprise one or more "cards" 520 representing one or more reward offers. The cards 520 may be displayed, for example, in the format of a carousel or a stack. Each reward offer card 520 may comprise a logo of a merchant associated with the reward offer, a name of the merchant, and content of the reward offer. As an example and not by way of limitation, the reward offer card 520a may show a logo for the merchant, a name of the merchant, and a specification that the reward offer is redeemable for a 10% discount. The user may select one or more of the reward offers 520 and interact with the user interface 500 (e.g., drag left or right) to view one or more reward offers 520. The user interface 500 may further comprise a prompt 530 asking the user to pick one or more reward and a button 540 allowing the user to indicate that she has finished picking reward offers. In this user interface 500, the user may also temporarily hide a reward offer, which may be withheld from being displayed for a period.

Figure 5B:
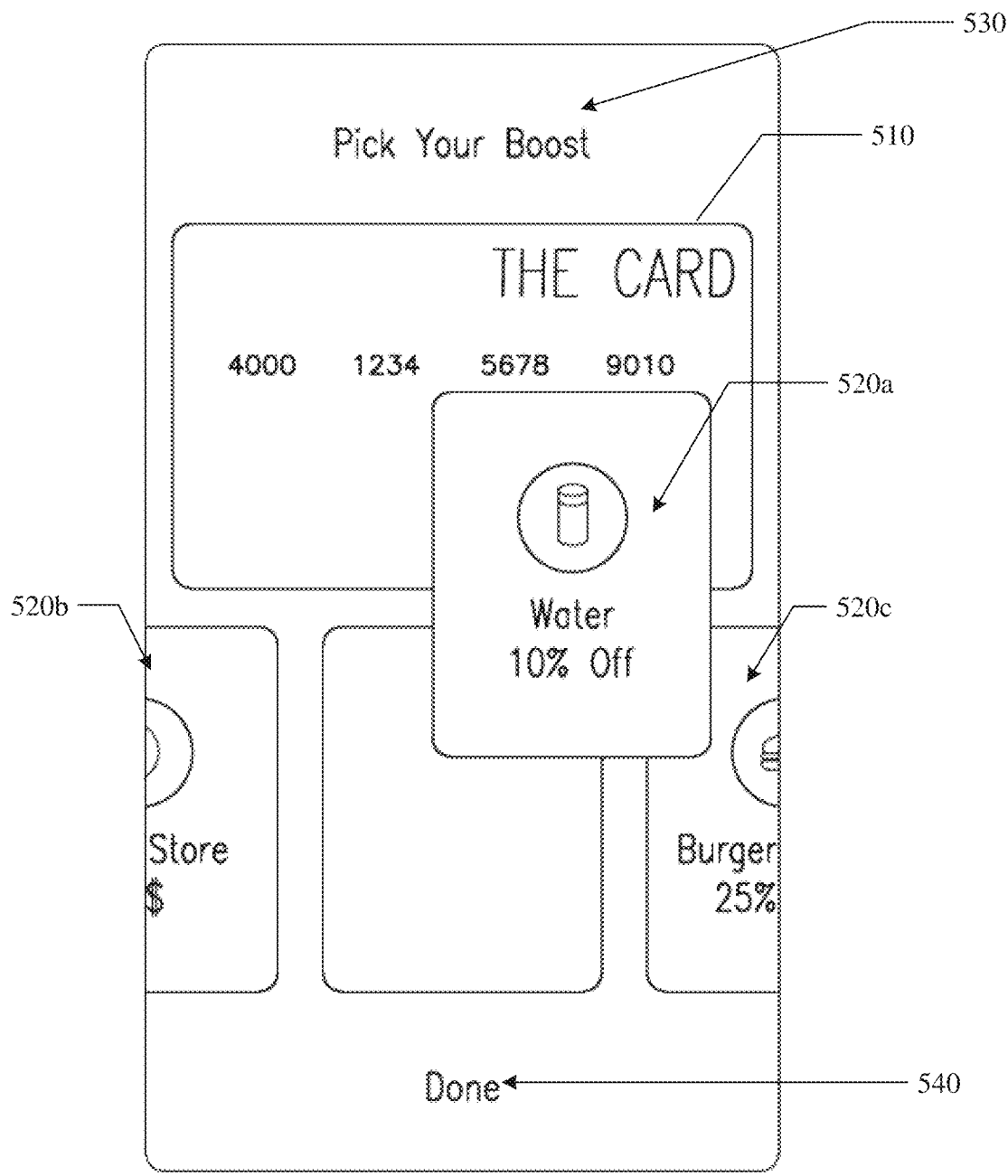
FIG. 5B illustrates example animation effects associated with selection of a reward offer.

FIG. 5B illustrates example animation effects associated with selection of a reward offer. In particular embodiments, the user may pick a reward offer 520 using one or more mouse inputs or touch-screen gestures. As an example and not by way of limitation, the user may select the reward offer 520a (using a cursor or a finger), drag it, and drop it in the field 510 indicating an assignment of the reward offer 520a to the virtual payment card 510. The payment service system 108 or the application 222 may provide for display one or more animation effects corresponding to the user's gesture. As an example and not by way of limitation, the reward offer card 520a may move with the cursor or the user's finger when dragged and merge with the virtual payment card 510 when dropped. When the reward offer card 520 is selected, the field 510 may be enlarged and move forward towards a viewer. Elements of the user interface 500 other than the virtual payment card and the reward offer may become blurry. Elements of the user interface 500 may return to their normal position, size, and clarity after the reward offer card 520 is dropped in the field 510. Although this disclosure describes and illustrates particular animation effects associated with associated with selection of a reward offer, this disclosure contemplates any suitable animation effects associated with any suitable functionalities or user interactions.

Figure 5C:
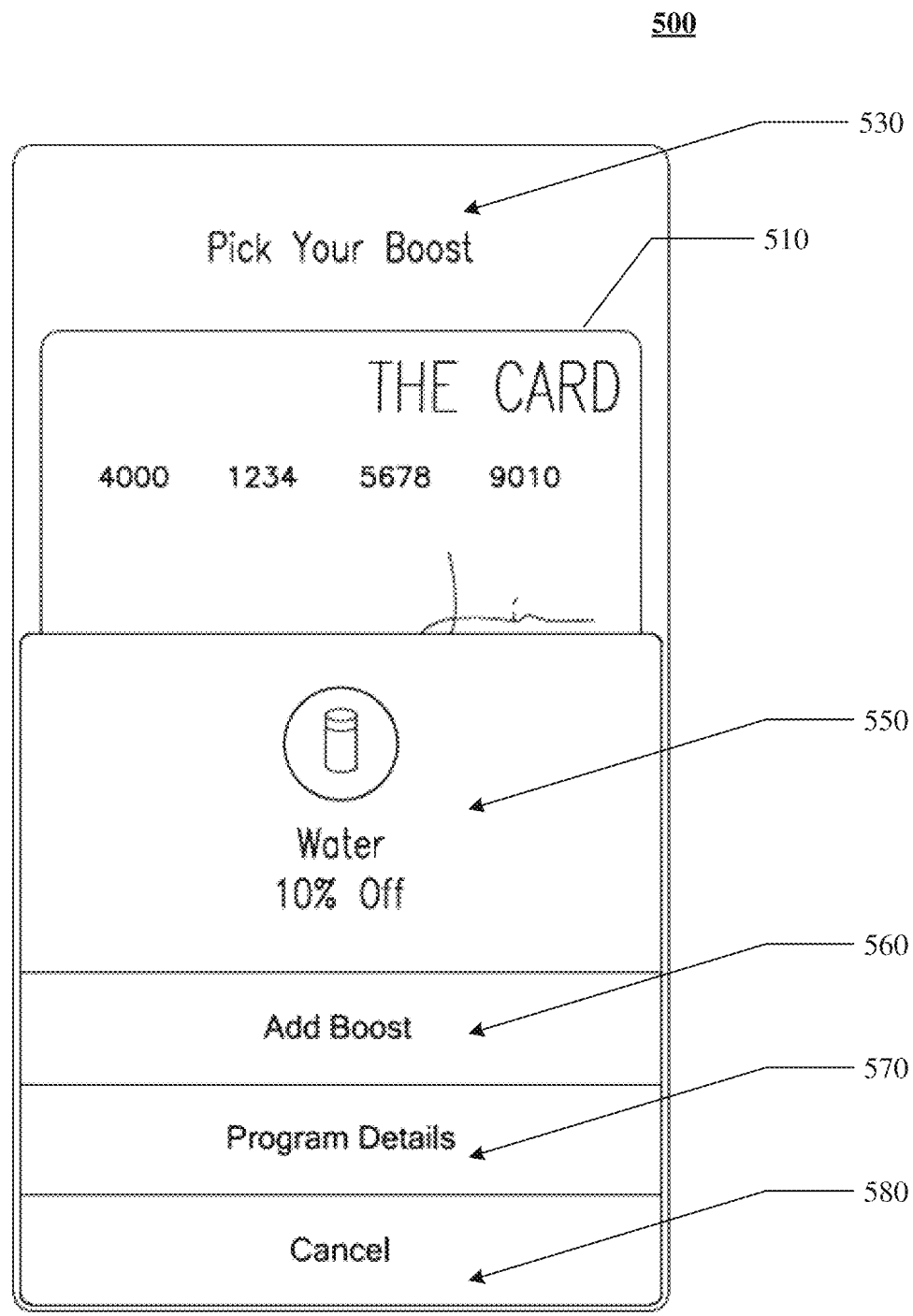
FIG. 5C illustrates an example user interface displaying a menu associated with a reward offer.

FIG. 5C illustrates an example user interface 500 displaying a menu associated with a reward offer. In particular embodiments, in the user interface illustrated by FIG. 5A, a user may click on or press on a particular reward offer card 520 (e.g., the reward offer card 520a). The application 222 may then display a menu associated with the reward offer. The menu may comprise basic information 550 associated with the reward offer. It may also comprise a button 560 corresponding to adding the reward offer, a button 570 corresponding to display of additional details about the reward offer, and a button 580 corresponding to closing the menu.

Figure 6A:
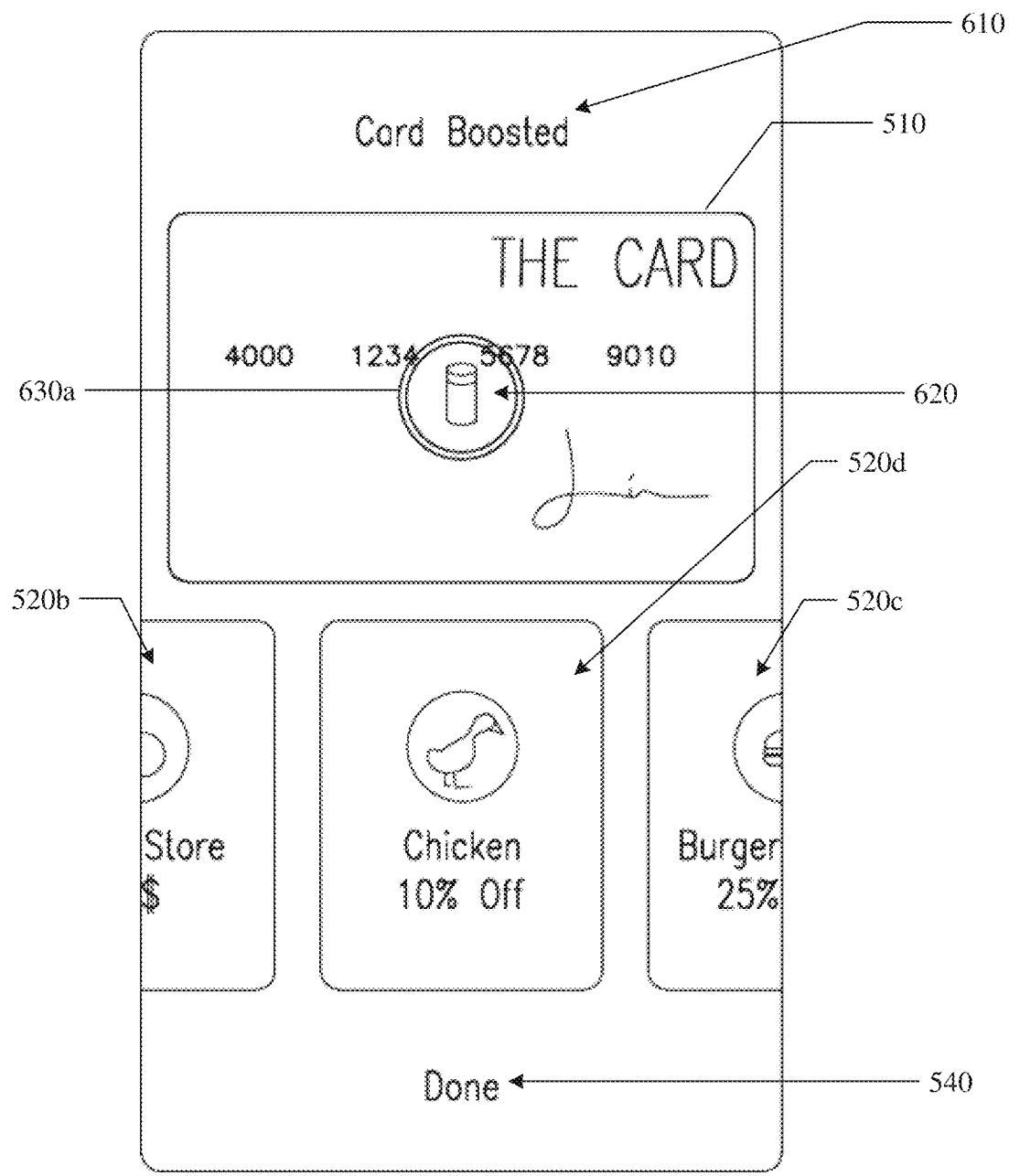
FIGS. 6A-6E illustrate example animation effects associated with activating a reward offer.
Figure 6B:
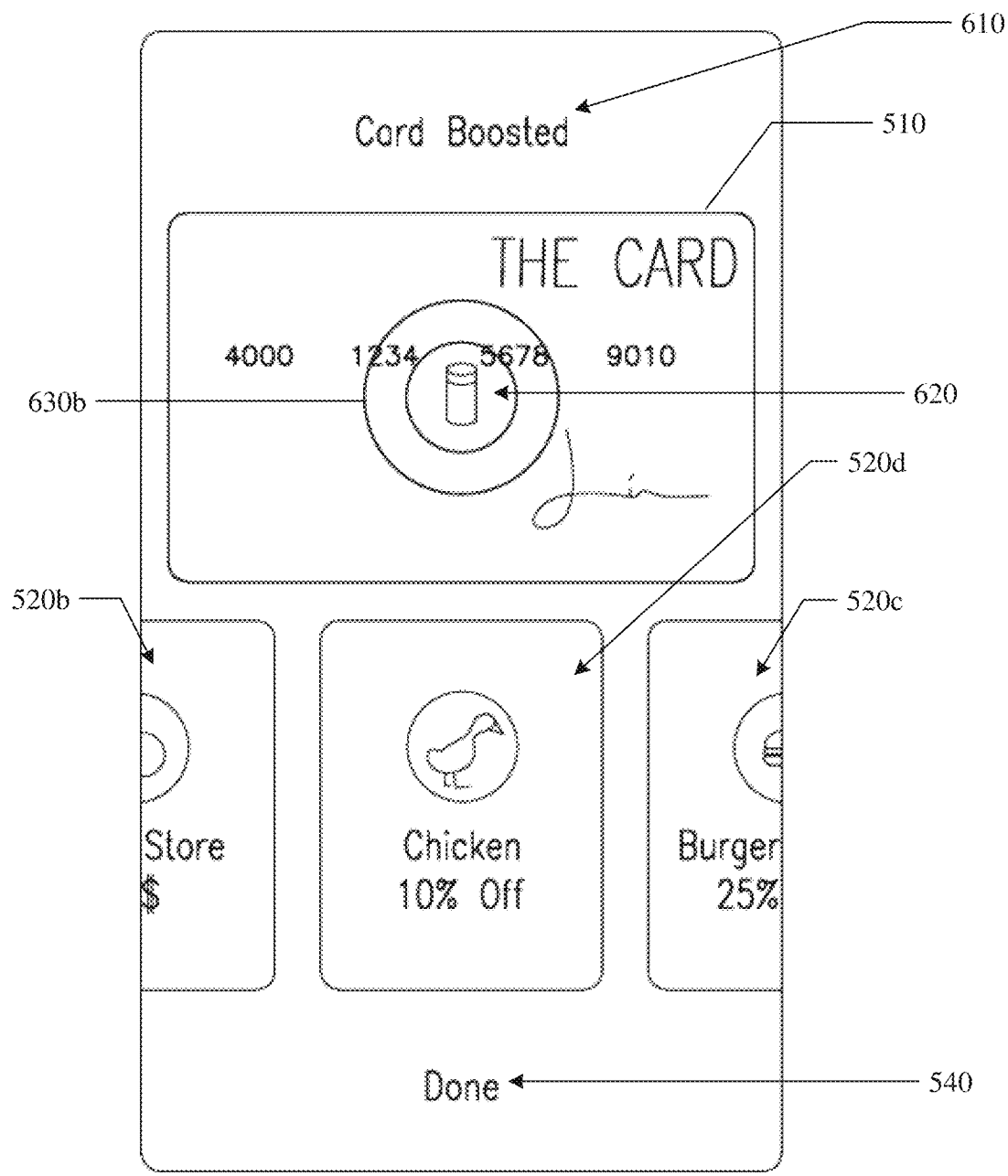
Figure 6C:
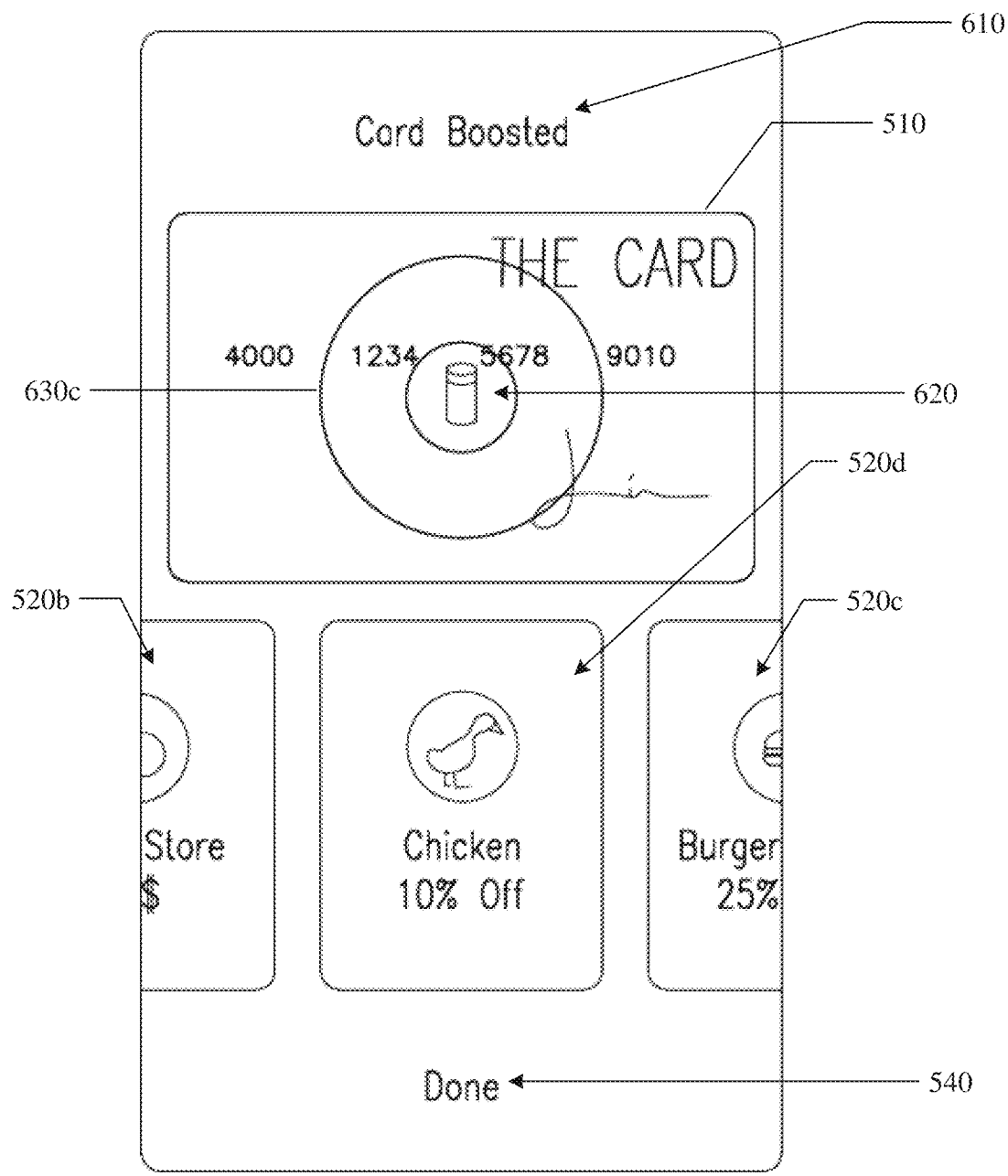
Figure 6D:
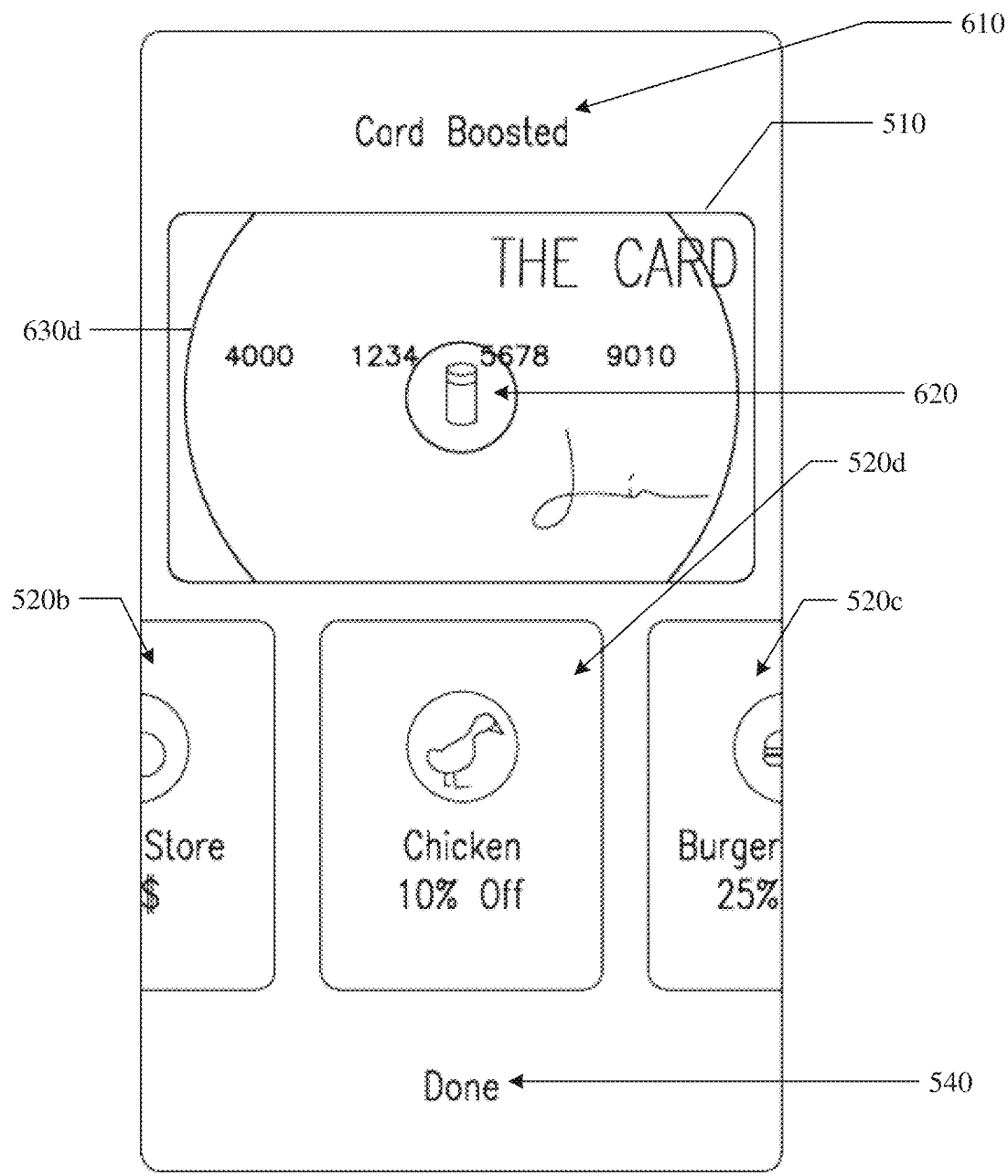
Figure 6E:
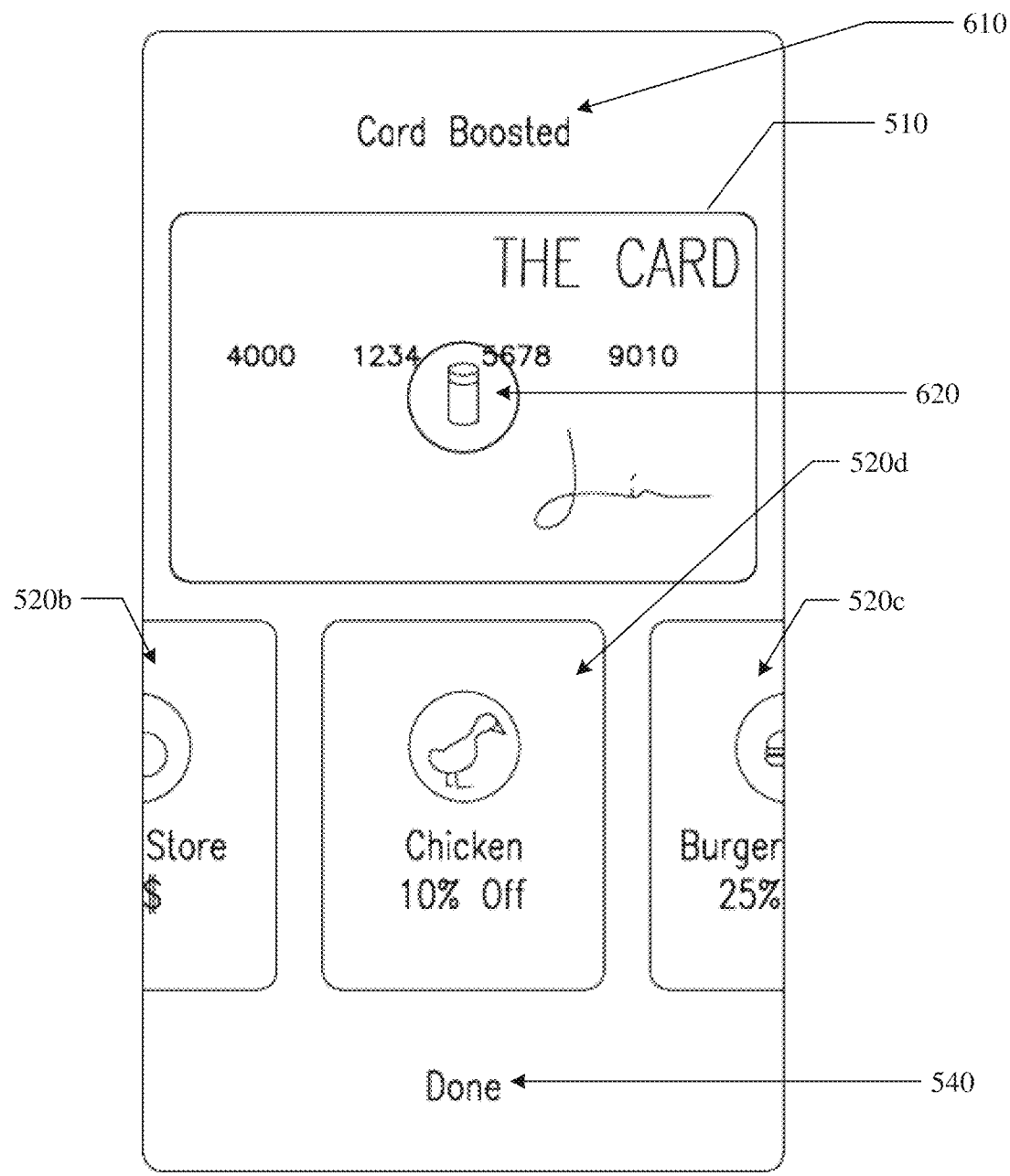

FIGS. 6A-6E illustrate example animation effects in user interface 600 associated with activating a reward offer. In particular embodiments, a user may add a reward offer to a payment card by, for example, dragging a reward offer card 520a to a field 510 representing a virtual payment card or clicking on or pressing on a button 560 corresponding to adding the reward offer. When a reward offer is added or connected to a virtual payment card, the application 222 may provide for display status indicator 610 and/or one or more animation effects in response. As an example and not by way of limitation, when the reward offer 520a is linked to the virtual payment card, the field 510 may display a logo 620 of the merchant associated with the reward offer 520a. As another example and not by way of limitation, when the reward offer 520a is linked to the virtual payment card, a color of the field 510 may be changed to match that of the logo 620 of the merchant associated with the reward offer 520a. As yet another example and not by way of limitation, when dropped in the field 510, the reward offer card 520a may cause one or more animation effects corresponding to water ripples. As illustrated by FIGS. 6A-6E, the animation effects may comprise a circular contour 630 originating from the logo 620 and expanding to the borders of the field 510. For example, the contour 630 may proceed from the position 630*a* to 630*b*, to 630*c*, and to 630*d* in four frames associated with the animation effect corresponding to water ripples. The circular contour 630 may act as a boundary separating different colors in the field 510. For example, the region enclosed by the circular contour 630 may have the same color as the logo 620, while the region outside of the circular contour 630 may have a default color of the virtual payment card field 510. The animation effects 630 may disappear after a period of time to create an impression that the reward offer 520*a* is fully activated (as illustrated by FIG. 6E), at which point, the field 510 may fully be changed to the color of the logo 620. Although this disclosure describes and illustrates particular animation effects associated with activating a reward offer, this disclosure contemplates any suitable animation effects associated with any suitable functionalities or user interactions.

Figure 7:
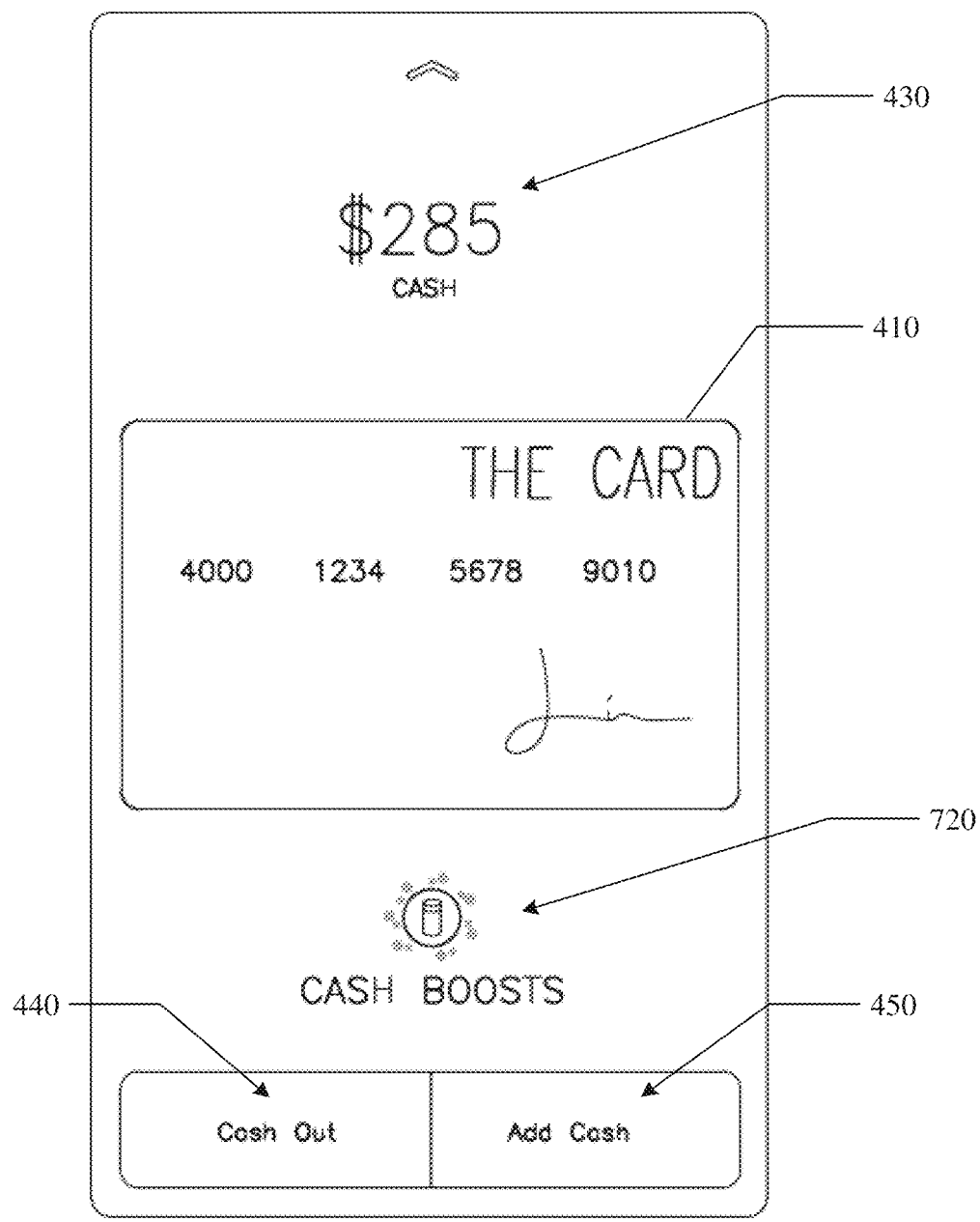
FIG. 7 illustrates an example user interface displaying a reward offer being connected to a virtual payment card.

FIG. 7 illustrates an example user interface 700 displaying a reward offer being connected to a virtual payment card. This user interface 700 may be displayed after the user picks at least one reward offer and assigns the reward offer to the virtual payment card 410. The user interface 700 may comprise a representation 720 of a selected reward offer. The representation 720 may be displayed with one or more animation effects. As an example and not by way of limitation, the animation effects may involve a plurality of blinking dots around a logo of the merchant associated with the reward offer. The blink dots may vary in size and color. The dots may gradually fade away to create an effect that the reward offer settles in. Although this disclosure describes and illustrates particular animation effects associated with particular user interfaces displaying a reward offer being connected to a virtual payment card, this disclosure contemplates any suitable animation effects associated with any suitable user interfaces for displaying a reward offer being connected to a virtual payment card.

Figure 8:
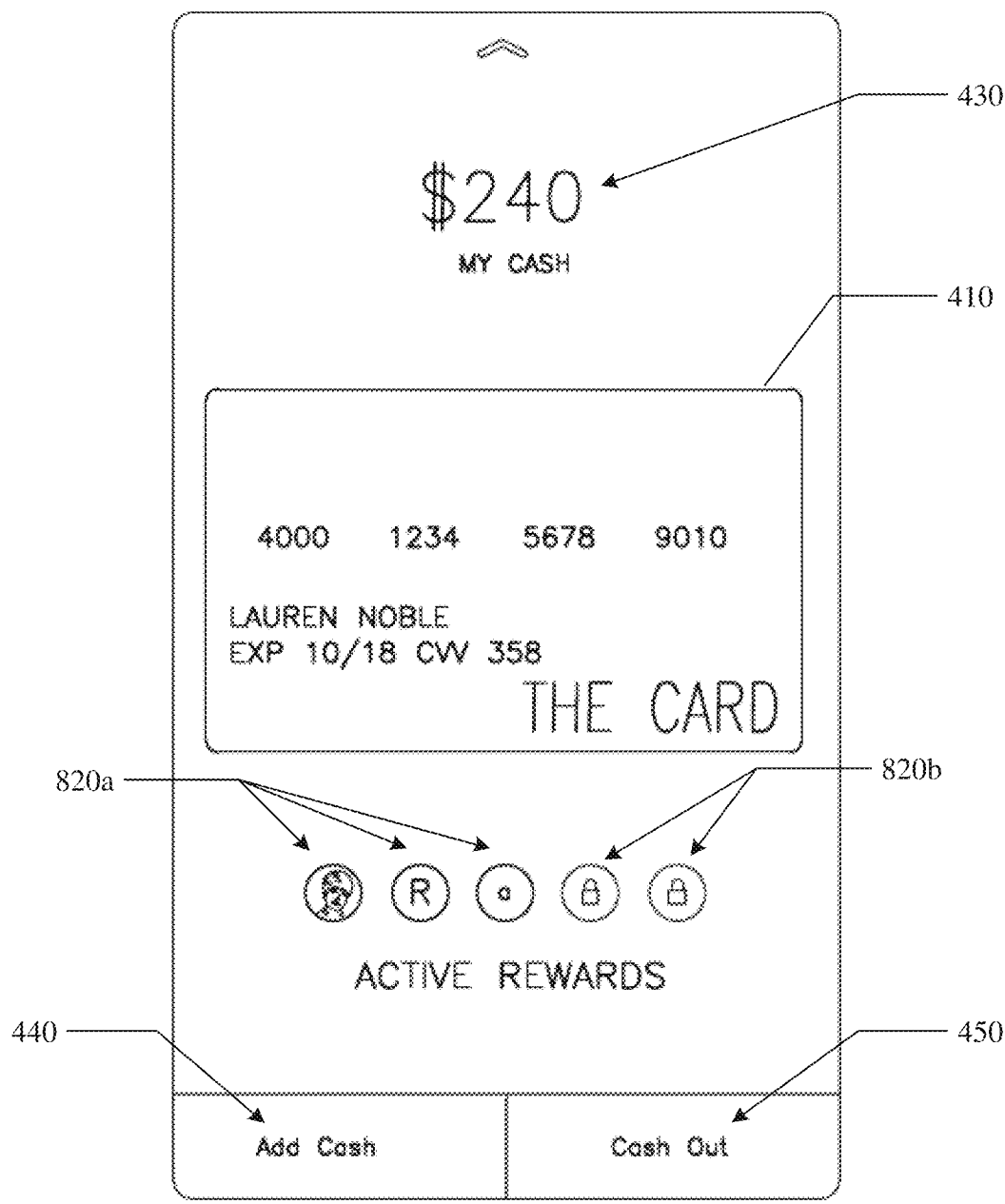
FIG. 8 illustrates an example user interface displaying accepted reward offers and the open slots for additional reward offers.

FIG. 8 illustrates an example user interface 800 displaying accepted reward offers and the open slots for additional reward offers. In particular embodiments, the payment service system 108 may allow a user to link multiple reward offers to a payment card. Specifically, the payment service may provide the user with multiple "slots" for adding reward offers to. The number of slots available to a user may be determined based on a membership status of the user or the user's payment account. A user who has a higher or more privileged membership status (e.g., Gold member) may be provided with more slots than a user who has a lower membership status (e.g., Silver member). The user interface 800 may comprise representation of one or more slots 820 available or potentially available to a user. One or more slots 820*a* may be filled with reward offers that have been provided to and accepted by the user. At least part of a logo of a merchant may be displayed in a circle representing each of the accepted offers 820*a*. One or more slots 820*b* may be empty and not linked to any reward offer. An empty slot 820*b* may currently be available to a user. In this case, a "heart" symbol may be displayed within a circle representing the slot. Alternatively, an empty slot 820*b* may currently be unavailable to the user. In this case, a "lock" symbol may be displayed within a circle representing the slot. A locked slot 820*b* may be unlocked by the user by, for example, conducting one or more desired activities (e.g., setting up a direct deposit to the payment account, inviting one or more people to use the application 222, buy cryptocurrency through the application 222, use a required number of cash rewards) or attaining a particular level of membership.

Figure 9:
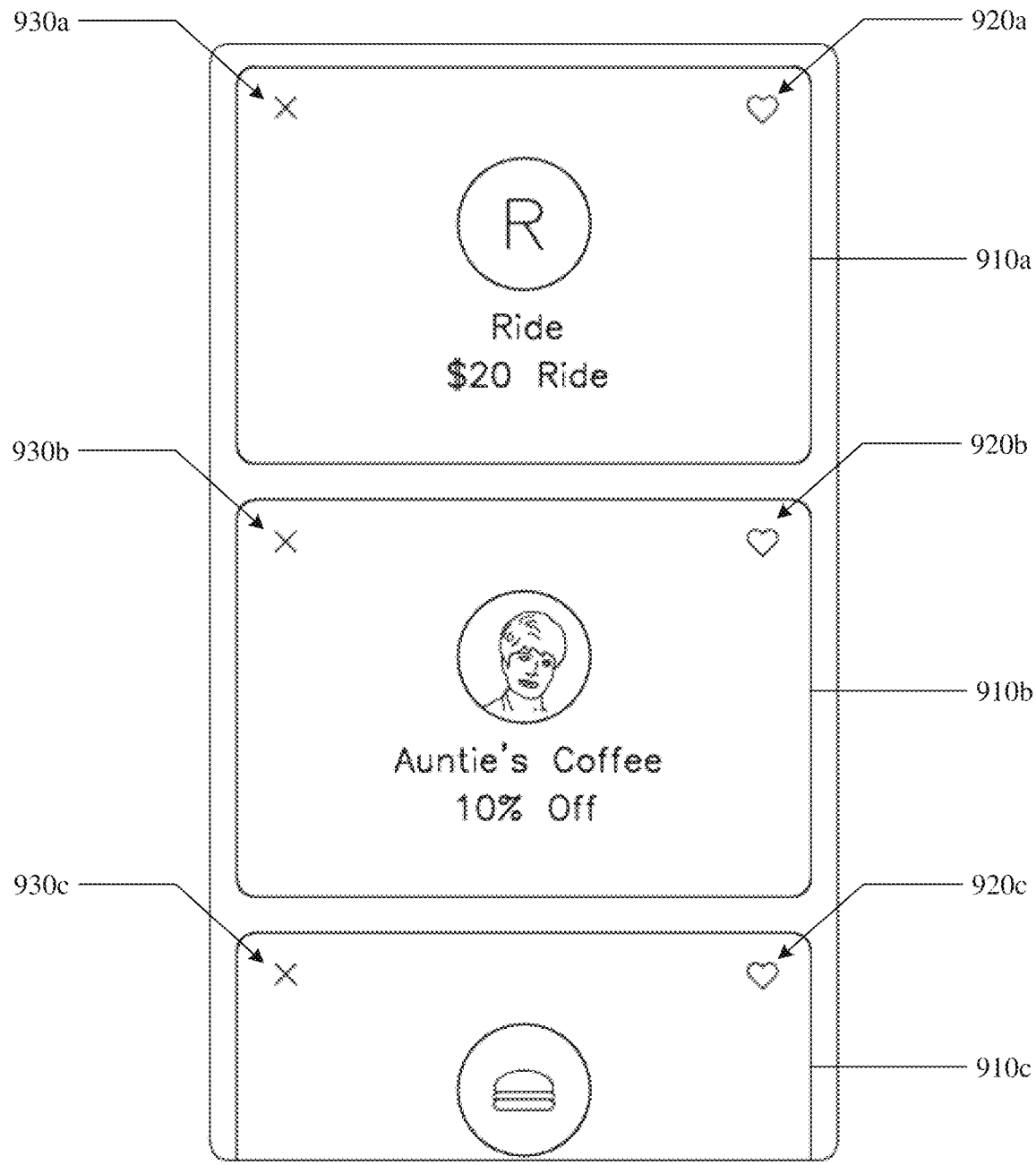
FIG. 9 illustrates an example user interface showing one or more reward offers.

FIG. 9 illustrates an example user interface showing one or more reward offers. In particular embodiments, a user may view one or more reward offers that has been accepted by the user in a user interface 900 rendered by the application 222. The reward offers may be presented as one or more cards 910 in the user interface 900. Each reward offer card 910 may comprise a time indicator corresponding to when the reward offer will expire. Each reward offer card 910 may also comprise an interactive element 920 (e.g., in the form of a "heart" symbol) allowing the user to "like" or "share" the reward offer. Each reward offer card 910 may further comprise an interactive element 930 (e.g., in the form of an "X" symbol) allowing the user to delete, dismiss, or remove the reward offer. The user may be allowed to drag the reward offer cards 910 up or down to view additional reward cards. The user may also be allowed to swipe a card to the left or the right to perform an action with respect to the card. For example, the user may swipe a card 910*a* corresponding to a reward offer to the left to dismiss the reward offer. The application 222 may show an animation effect of the card 910*a* moving with the cursor or finger to the left and revealing an "X" symbol as well as the word "DISMISS". For example, the user may swipe the card 910*a* to the right to share the reward offer with one or more friends. The application 222 may show an animation effect of the card 910*a* moving with the cursor or finger to the right and revealing a "heart" symbol as well as the word "SHARE". Although this disclosure describes and illustrates particular animation effects associated with particular user interfaces showing reward offers, this disclosure contemplates any suitable animation effects associated with any suitable user interfaces showing reward offers.

Figure 10:
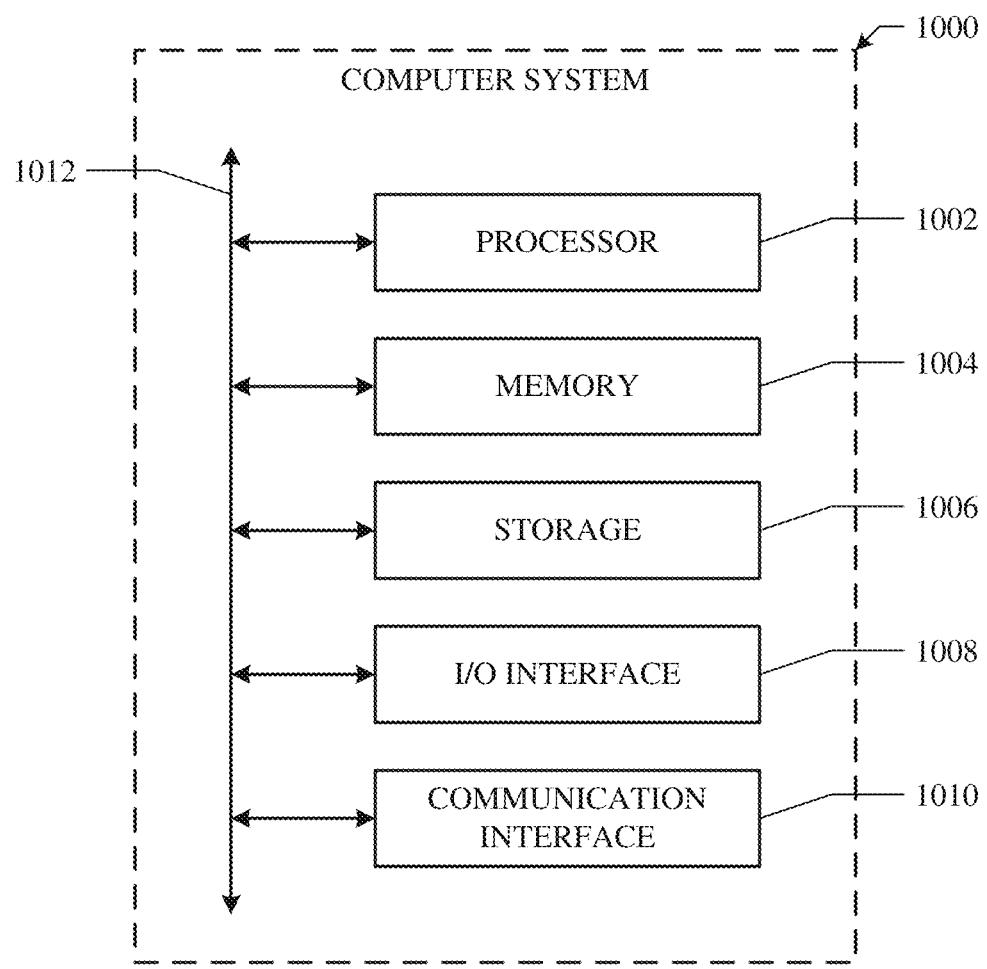
FIGS. 10 illustrate an example computer system.

FIG. 10 illustrates an example computer system 1000. The computer system 1000 may be a computer system associated with the payment service 108, POS device 105, or client device 103. While these devices may have components in common, such as those illustrated in FIG. 10, it should be appreciated that each of the payment service system 108, POS device 105, or client device 103 may be specialized devices configured for their specific purposes. In particular embodiments, one or more computer systems 1000 perform one or more steps of one or more methods described or illustrated herein. In particular embodiments, one or more computer systems 1000 provide functionality described or illustrated herein. In particular embodiments, software running on one or more computer systems 1000 performs one or more steps of one or more methods described or illustrated herein or provides functionality described or illustrated herein. Particular embodiments include one or more portions of one or more computer systems 1000. Herein, reference to a computer system may encompass a computing device, and vice versa, where appropriate. Moreover, reference to a computer system may encompass one or more computer systems, where appropriate.

This disclosure contemplates any suitable number of computer systems 1000. This disclosure contemplates computer system 1000 taking any suitable physical form. As example and not by way of limitation, computer system 1000 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 1000 may include one or more computer systems 1000; be unitary or distributed; span multiple locations; span multiple machines; span multiple data centers; or reside in a cloud, which may include one or more cloud components in one or more networks. Where appropriate, one or more computer systems 1000 may perform without substantial spatial or temporal limitation one or more steps of one or more methods described or illustrated herein. As an example and not by way of limitation, one or more computer systems 1000 may perform in real time or in batch mode one or more steps of one or more methods described or illustrated herein. One or more computer systems 1000 may perform at different times or at different locations one or more steps of one or more methods described or illustrated herein, where appropriate.

In particular embodiments, computer system 1000 includes a processor 1002, memory 1004, storage 1006, an input/output (I/O) interface 1008, a communication interface 1010, and a bus 1012. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1002 includes hardware for executing instructions, such as those making up a computer program. As an example and not by way of limitation, to execute instructions, processor 1002 may retrieve (or fetch) the instructions from an internal register, an internal cache, memory 1004, or storage 1006; decode and execute them; and then write one or more results to an internal register, an internal cache, memory 1004, or storage 1006. In particular embodiments, processor 1002 may include one or more internal caches for data, instructions, or addresses. This disclosure contemplates processor 1002 including any suitable number of any suitable internal caches, where appropriate. As an example and not by way of limitation, processor 1002 may include one or more instruction caches, one or more data caches, and one or more translation lookaside buffers (TLBs). Instructions in the instruction caches may be copies of instructions in memory 1004 or storage 1006, and the instruction caches may speed up retrieval of those instructions by processor 1002. Data in the data caches may be copies of data in memory 1004 or storage 1006 for instructions executing at processor 1002 to operate on; the results of previous instructions executed at processor 1002 for access by subsequent instructions executing at processor 1002 or for writing to memory 1004 or storage 1006; or other suitable data. The data caches may speed up read or write operations by processor 1002. The TLBs may speed up virtual-address translation for processor 1002. In particular embodiments, processor 1002 may include one or more internal registers for data, instructions, or addresses. This disclosure contemplates processor 1002 including any suitable number of any suitable internal registers, where appropriate. Where appropriate, processor 1002 may include one or more arithmetic logic units (ALUs); be a multi-core processor; or include one or more processors 1002. Although this disclosure describes and illustrates a particular processor, this disclosure contemplates any suitable processor.

In particular embodiments, memory 1004 includes main memory for storing instructions for processor 1002 to execute or data for processor 1002 to operate on. As an example and not by way of limitation, computer system 1000 may load instructions from storage 1006 or another source (such as, for example, another computer system 1000) to memory 1004. Processor 1002 may then load the instructions from memory 1004 to an internal register or internal cache. To execute the instructions, processor 1002 may retrieve the instructions from the internal register or internal cache and decode them. During or after execution of the instructions, processor 1002 may write one or more results (which may be intermediate or final results) to the internal register or internal cache. Processor 1002 may then write one or more of those results to memory 1004. In particular embodiments, processor 1002 executes only instructions in one or more internal registers or internal caches or in memory 1004 (as opposed to storage 1006 or elsewhere) and operates only on data in one or more internal registers or internal caches or in memory 1004 (as opposed to storage 1006 or elsewhere). One or more memory buses (which may each include an address bus and a data bus) may couple processor 1002 to memory 1004. Bus 1012 may include one or more memory buses, as described below. In particular embodiments, one or more memory management units (MMUs) reside between processor 1002 and memory 1004 and facilitate accesses to memory 1004 requested by processor 1002. In particular embodiments, memory 1004 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1004 may include one or more memories 1004, where appropriate. Although this disclosure describes and illustrates particular memory, this disclosure contemplates any suitable memory.

In particular embodiments, storage 1006 includes mass storage for data or instructions. As an example and not by way of limitation, storage 1006 may include a hard disk drive (HDD), a floppy disk drive, flash memory, an optical disc, a magneto-optical disc, magnetic tape, or a Universal Serial Bus (USB) drive or a combination of two or more of these. Storage 1006 may include removable or non-removable (or fixed) media, where appropriate. Storage 1006 may be internal or external to computer system 1000, where appropriate. In particular embodiments, storage 1006 is non-volatile, solid-state memory. In particular embodiments, storage 1006 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1006 taking any suitable physical form. Storage 1006 may include one or more storage control units facilitating communication between processor 1002 and storage 1006, where appropriate. Where appropriate, storage 1006 may include one or more storages 1006. Although this disclosure describes and illustrates particular storage, this disclosure contemplates any suitable storage.

In particular embodiments, I/O interface 1008 includes hardware, software, or both, providing one or more interfaces for communication between computer system 1000 and one or more I/O devices. Computer system 1000 may include one or more of these I/O devices, where appropriate. One or more of these I/O devices may enable communication between a person and computer system 1000. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1008 for them. Where appropriate, I/O interface 1008 may include one or more device or software drivers enabling processor 1002 to drive one or more of these I/O devices. I/O interface 1008 may include one or more I/O interfaces 1008, where appropriate. Although this disclosure describes and illustrates a particular I/O interface, this disclosure contemplates any suitable I/O interface.

In particular embodiments, communication interface 1010 includes hardware, software, or both providing one or more interfaces for communication (such as, for example, packet-based communication) between computer system 1000 and one or more other computer systems 1000 or one or more networks. As an example and not by way of limitation, communication interface 1010 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1010 for it. As an example and not by way of limitation, computer system 1000 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1000 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1000 may include any suitable communication interface 1010 for any of these networks, where appropriate. Communication interface 1010 may include one or more communication interfaces 1010, where appropriate. Although this disclosure describes and illustrates a particular communication interface, this disclosure contemplates any suitable communication interface.

In particular embodiments, bus 1012 includes hardware, software, or both coupling components of computer system 1000 to each other. As an example and not by way of limitation, bus 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1012 may include one or more buses 1012, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A system associated with a payment service comprising:
    one or more processors;
    one or more data stores storing user information associated with a plurality of users of the payment service, merchant information associated with a plurality of merchants, and a plurality of records of transactions between the plurality of merchants and the plurality of users of the payment service, and
    one or more computer-readable non-transitory storage media coupled to one or more of the processors, wherein the media comprises instructions operable when executed by one or more of the processors to cause the system to:
    use a machine learning model to determine respective merchant categories for respective merchants of the plurality of merchants, the machine learning model trained to classify the respective merchants into respective merchant categories based at least on features determined from payment activities of the respective merchants;

storing the respective merchant categories determined for the respective merchants in the one or more data stores in association with the merchant information;

determine, for a user of the plurality of users, and based on the plurality of records of transactions and the respective merchant categories stored in association with the merchant information in the one or more data stores, a reward offer to link to a payment account of the user, wherein the reward offer is applicable to a merchant category associated with the merchant information and is redeemable upon confirmation of satisfaction of one or more criteria, wherein one of the one or more criteria include conducting a transaction with at least one merchant categorized in the merchant category for which the reward offer is applicable;

link the reward offer to the payment account of the user;

receive, via an application executing on a point of sale device of a merchant of the plurality of merchants, transaction information associated with a new transaction between the user and the merchant, wherein the transaction information includes identifying information for the payment account of the user;

subsequent to receiving the transaction information, identify the reward offer linked to the payment account of the user;

determine, based on the transaction information and the reward offer linked to the payment account that the one or more criteria for the reward offer are satisfied;

based on determining that the one or more criteria for the reward offer are satisfied, automatically redeem the reward offer to reduce a value associated with the payment amount for the new transaction;

automatically debit the payment account of the user in accordance with the reduced value associated with the payment amount;

automatically credit a payment account associated with the merchant with the payment amount; and send, to an application installed on a client device associated with the user, information for presenting a user interface indicating that the reward offer has been redeemed in association with the new transaction.

2. The system of claim 1, wherein the user interface comprises a receipt for the new transaction, the receipt comprising information associated with redemption of the reward offer.

3. The system of claim 1, wherein the instructions are further operable when executed to cause the system to:
add information associated with redemption of the reward offer to a transaction history associated with the user; and
send, to the application installed on the client device, information for presenting another user interface displaying at least part of the transaction history.

4. The system of claim 3, wherein the instructions are further operable when executed to cause the system to:
determine a membership status of the user based at least in part on the transaction history.

5. The system of claim 4, wherein the value associated with the payment amount for the new transaction is reduced by an amount determined based on item data associated with the new transaction and the membership status of the user.

6. A method comprising, by one or more computing devices associated with a payment service:

accessing, by the one or more computing devices associated with the payment service from a database associated with the payment service, a plurality of records of transactions between a plurality of merchants and a plurality of users of the payment service;

using, by the one or more computing devices associated with the payment service, a machine learning model to determine respective merchant categories for respective merchants of the plurality of merchants, the machine learning model trained to classify the respective merchants into respective merchant categories based at least on features determined from payment activities of the respective merchants;

storing the respective merchant categories determined for the respective merchants in a data store that stores merchant information associated with the plurality of merchants;

determining, for a user of the plurality of users, and based on the merchant information in the data store and the plurality of records of transactions, a reward offer to link to a payment account of the user, wherein the reward offer is applicable to a merchant category indicated in the data store and is redeemable upon confirmation of satisfaction of one or more criteria, wherein the one or more criteria include conducting a transaction with at least one merchant categorized in the merchant category to which the reward offer is applicable;

linking the reward offer to the payment account of the user in the database associated with the payment service;

receiving, by the one or more computing devices associated with the payment service and via a first application executing on a merchant system associated with a merchant of the plurality of merchants, payment information about a payment from the user to the merchant for a new transaction using the payment account of the user, the payment information comprising identifying information for the payment account of the user;

subsequent to receiving the payment information, identifying, by the one or more computing devices associated with the payment service, the reward offer linked to the payment account in the database associated with the payment service;

analyzing the payment information and information associated with the new transaction to determine whether the one or more criteria associated with the reward offer are satisfied;

based at least on determining that the one or more criteria for the reward offer are satisfied, automatically redeeming the reward offer to reduce a value associated with the payment;

automatically debiting the payment account of the user in accordance with the reduced value associated with the payment;

automatically crediting a payment account associated with the merchant with the value associated with the payment; and sending, to a second application installed on a client device associated with the user, information for presenting a user interface indicating that the reward offer has been redeemed in association with the payment.

7. The method of claim 6, wherein:
the payment account of the user is associated with a virtual payment card stored on the client device; and
receiving the payment information about the payment from the user to the merchant for the new transaction using the payment account of the user comprises receiving information received by the merchant system based on the client device being placed in proximity to a near-field-communication (NFC) terminal associated with the merchant.

8. The method of claim 6, wherein:
the payment account is associated with a physical payment card issued to the user by the payment service; and
receiving the payment information about the payment from the user to the merchant for the new transaction using the payment account of the user comprises receiving information received by the merchant system based on the physical payment card being placed in contact with a point-of-sale (POS) device associated with the merchant.

9. The method of claim 6, wherein determining that the one or more criteria associated with the reward offer are satisfied comprises determining that the merchant receiving the payment is categorized in the merchant category to which the reward offer is applicable.

10. The method of claim 6, wherein the user interface comprises a receipt for the payment, the receipt comprising information associated with redemption of the reward offer.

11. The method of claim 6, further comprising:
adding information associated with redemption of the reward offer to a transaction history associated with the user; and
sending, to the second application installed on the client device, information for presenting another user interface displaying at least part of the transaction history.

12. The method of claim 11, further comprising:
determining a membership status of the user based at least in part on the transaction history.

13. The method of claim 12, wherein the value associated with the payment is reduced by an amount determined based on information associated with the new transaction and the membership status of the user.

14. The method of claim 6, wherein the determining the one or more reward offers to link to the payment account of the user comprises:
comparing a transaction history associated with the payment account of the user with one or more transaction histories associated with one or more other payment accounts of other users of the plurality of users of the payment service;
identifying, based on the comparison, a merchant predicted to be relevant to the user; and
determining the reward offer based in part on the merchant predicted to be relevant to the user.

15. The method of claim 6, wherein the determining the one or more reward offers to link to the payment account of the user comprises:
identifying an expired reward offer associated with the payment account of the user; and
identifying the reward offer based on similarity to the expired reward offer associated with the payment account of the user.

16. The method of claim 6, wherein the determining the one or more reward offers to link to the payment account of the user comprises:
determining, based on a transaction history associated with the payment account of the user, the merchant category applicable to the reward offer based on one or more of the merchants with which the user has made one or more transactions.

17. The system of claim 6, wherein the machine learning model is trained to learn a vector representation of the respective merchants of the plurality of merchants.

18. One or more computer-readable non-transitory storage media embodying software that is operable when executed to:
access, from a database associated with a payment service, a plurality of records of transactions between a plurality of merchants and a plurality of users of the payment service;
use a machine learning model to determine respective merchant categories for respective merchants of the plurality of merchants, the machine learning model trained to classify the respective merchants into respective merchant categories based at least on features determined from payment activities of the respective merchants;
store the respective merchant categories determined for the respective merchants in a data store that stores merchant information associated with the plurality of merchants;
determine, for a user of the plurality of users, and based on the merchant information in the data store and the plurality of records of transactions, a reward offer to link to the payment account of the user, wherein the reward offer is applicable to a merchant category indicated in the data store and is redeemable upon confirmation of satisfaction of one or more criteria, wherein the one or more criteria include conducting a transaction with at least one merchant categorized in the merchant category to which the reward offer is applicable;
link the reward offer to the payment account of the user in the database associated with the payment service;
receive, via a first application executing on a merchant system associated with a merchant of the plurality of merchants, payment information about a payment from user to the merchant for a new transaction using the payment account of the user, the payment information comprising identifying information for the payment account of the user;
subsequent to receiving the payment information, identify the reward offer linked to the payment account in the database associated with the payment service;
analyze the payment information and information associated with the new transaction to determine whether the one or more criteria associated with the reward offer are satisfied;
based at least on determining that the one or more criteria for the reward offer are satisfied, automatically redeem the reward offer to reduce a value associated with the payment;
automatically debit the payment account of the user in accordance with the reduced value associated with the payment;
automatically credit a payment account associated with the merchant with the value associated with the payment; and
send, to a second application installed on a client device associated with the user, information for presenting a user interface indicating that the reward offer has been redeemed in association with the payment.

19. The media of claim 18, wherein:
the payment account is associated with a virtual payment card stored on the client device; and
receiving the payment information about the payment from the user to the merchant for the new transaction using the payment account of the user comprises receiving information received by the merchant system based on the client device being placed in proximity to a near-field-communication (NFC) terminal associated with the merchant.

20. The media of claim 18, wherein:

the payment account is associated with a physical payment card issued to the user by the payment service; and receiving the payment information about the payment from the user to the merchant for the new transaction using the payment account of the user comprises receiving information received by the merchant system based on the physical payment card being placed in contact with a point-of-sale (POS) device associated with the merchant.

* * * * *